United States Patent
Fukuoka et al.

(10) Patent No.: US 7,580,358 B2
(45) Date of Patent: Aug. 25, 2009

(54) BIDIRECTIONAL COMMUNICATION CONTROL APPARATUS, TERMINAL APPARATUS, AND BIDIRECTIONAL COMMUNICATION CONTROL METHOD

(75) Inventors: Toshihiko Fukuoka, Osaka (JP); Machiya Kumazawa, Osaka (JP); Tatsuji Ishii, Osaka (JP)

(73) Assignee: Panasonic Corporation, Osaka (JP)

( * ) Notice: Subject to any disclaimer, the term of this patent is extended or adjusted under 35 U.S.C. 154(b) by 544 days.

(21) Appl. No.: 11/326,526

(22) Filed: Jan. 6, 2006

(65) Prior Publication Data

US 2006/0120400 A1    Jun. 8, 2006

Related U.S. Application Data

(63) Continuation of application No. PCT/JP2004/010175, filed on Jul. 9, 2004.

(30) Foreign Application Priority Data

Jul. 11, 2003 (JP) .............................. 2003-273535

(51) Int. Cl.
*G01R 31/08* (2006.01)
*H04L 12/413* (2006.01)

(52) U.S. Cl. .................. 370/235; 370/236; 370/447

(58) Field of Classification Search ................ 370/235, 370/236, 447

See application file for complete search history.

(56) References Cited

U.S. PATENT DOCUMENTS

| | | | |
|---|---|---|---|
| 6,498,808 B1 | 12/2002 | Tzannes | |
| 7,017,176 B1* | 3/2006 | Lee et al. | ..................... 725/111 |
| 2003/0061623 A1* | 3/2003 | Denney et al. | ............... 725/125 |

FOREIGN PATENT DOCUMENTS

| | | |
|---|---|---|
| JP | 2002-176465 | 6/2002 |
| JP | 2003-509789 A | 3/2003 |
| JP | 2003-153221 A | 5/2003 |
| WO | WO 01/20864 A1 | 3/2001 |

OTHER PUBLICATIONS

"Data-Over-Cable Service Interface Specifications," 2001, pp. 1-424, CableLabs, Cable Television Laboratories, Inc.

* cited by examiner

*Primary Examiner*—Barry W Taylor
(74) *Attorney, Agent, or Firm*—McDermott Will & Emery LLP

(57) ABSTRACT

A terminal apparatus of a communication system is provided with an MAC section (bidirectional communication apparatus), a PHY section, a tuner, and a back-end section. The MAC section comprises a downstream data processing block having a function of substituting for a portion of the process of the CPU, a upstream data processing block having a function of substituting for a portion of the process of the CPU, a bus data arbitration processing block, a CPU bus, the CPU, and a storage apparatus. The downstream data processing block and the upstream data processing block perform direct data transmission/reception while bypassing the CPU bus.

11 Claims, 15 Drawing Sheets

BIDIRECTIONAL COMMUNICATION CONTROL APPARATUS, TERMINAL APPARATUS, AND BIDIRECTIONAL COMMUNICATION CONTROL METHOD

RELATED APPLICATIONS

This application is a continuation of International Application No. PCT/JP2004/010175 whose international filing date is Jul. 9, 2004, which in turn claims the benefit of Japanese Patent Application No. 2003-273535, filed on Jul. 11, 2003, the disclosures of which Applications are incorporated by reference herein.

FIELD OF THE INVENTION

The present invention relates to a bidirectional communication control apparatus for use in digital bidirectional communication between a center apparatus and a terminal apparatus, a terminal apparatus comprising the same, and a bidirectional control method.

DESCRIPTION OF THE PRIOR ART

Generally, a digital bidirectional communication system, such as representatively bidirectional CATV, is composed of a bidirectional communication network in which a plurality of terminal apparatuses are connected to a center apparatus. Each terminal apparatus has a bidirectional control function called an MAC (Media Access Control) function which controls downstream communication from the center apparatus to the terminal apparatus and upstream communication from the terminal apparatus to the center apparatus. The process function is ordinarily achieved by deciphering a protocol having a structure specific to MAC buried as a sublayer in communication data.

As an example of the MAC structure, the MCNS (Multimedia Cable Network Systems partners) organized in the US by cable TV operators and cable TV set suppliers has proposed the DOCSIS (Data Over Cable Service Interface Specifications) technique, which is currently a de facto standard.

In the case of downstream communication, ordinarily, video data is mainly transmitted. Therefore, communication data in downstream communication has an MPEG structure, and as its sublayer, the MAC structure is defined. In downstream communication, communication channel frequencies are assigned to a relatively broad band, and therefore, communication control itself is relatively simple. However, in order to transmit video data, downstream communication needs to handle a huge amount of data. Therefore, it is necessary to perform the process in real time and without an error in accordance with a predetermined procedure.

On the other hand, in the case of upstream communication, ordinarily, control data is mainly transmitted. The control data includes a command request from a terminal apparatus, and state indicating data for informing a state of each terminal apparatus. After receiving control data transmitted in upstream communication, the center apparatus responds to a request command of each terminal apparatus, or transmits various information for correctly controlling a terminal apparatus as control data in downstream communication. In upstream communication, since a large number of communication channel frequencies are assigned to a narrow band, collision may occur between a plurality of terminal apparatuses, or a required communication channel frequency may not be obtained. Therefore, in upstream communication, complicated control is generally required, and the control function has large influence on communication performance in bidirectional communication.

The MAC structure in the DOCSIS technique has a data structure basically similar to that of Ethernet communication in order to enhance compatibility to IP communication using Ethernet. However, as areas specific to the DOCSIS technique, various header fields are provided. Among them, a variable-length area (field) called an "extended header" defines encryption and other additional functions.

To achieve the MAC function, it is necessary to perform various processes with appropriate timing after analysis of a data structure having a complicated multilayer structure. It is considerably difficult to achieve a huge number of combinations of a large number of processes, and verify the correctness of the combination operation, and it also requires a huge processing amount.

Next, attention is paid to the contents of each process in bidirectional communication. Each process constituting the MAC function is basically an individual process, such as a computational process of a control system, data filtering (dividing), synchronization, permutation, formatting, or the like, or a combination thereof.

However, apparatuses used in bidirectional communication have a data security function, which is essential for a communication system, in addition to the basic processes of the MAC function.

The security function of the MAC function is called Baseline Privacy, and employs a protocol called BPKM (Baseline Privacy Key Management). BPKM is provided with a function of encrypting an encryption key itself and exchanging it for safe key exchange, and a message authorization function for confirming that an encryption key exchange message is transmitted from a correct party and is not tampered. In BPKM, two keys, i.e., an authorization key (master key) and a DES encryption key (Traffic Encryption Key, referred to as TEK) actually used in encryption and decryption of data, are used to distribute the keys.

A terminal apparatus receives an authorization key encrypted by the RSA public key cryptography, and decrypts the authorization key using an RSA public key. Next, TEK data is obtained from the obtained authorization key via several processes, such as decryption and authorization of TEK, and finally, the TEK data is used to decrypt actual communication data. Here, a decryption process of RSA-encrypted data including decryption of an authorization key, and a decryption process of DES-encrypted data including decryption of TEK data require parallel and repetitive numerical computation using a plurality of pieces of 64-bit data, and therefore, each process requires a considerably large load. In order to achieve the MAC function which performs bidirectional control in digital bidirectional communication, a combination of these processes is considered to be required.

PROBLEMS TO BE SOLVED BY THE INVENTION

However, conventional bidirectional communication control apparatuses for achieving the MAC function have the following problem.

Generally, the MAC function is achieved using a general-purpose processor (CPU). The CPU has an advantage of flexibly handling a complicated process, and can relatively easily achieve verification or function modification for establishment of system reliability. Specifically, the CPU is used to try to achieve the MAC function using software which can relatively easily implement the complexity of the MAC function and the feedback of a verification result.

However, a high-performance CPU is required to achieve a huge amount of processing of the MAC function. A CPU is not merely occupied for the MAC function, but also the single CPU has difficulty in achieving the entire MAC function. Therefore, an apparatus capable of achieving the entire MAC function requires a significantly large hardware portion, leading to impractically high cost. If such a high-performance CPU is used, the operating frequency of a circuit becomes high, resulting in high power consumption. In this case, it is necessary to take measures for heat radiation and the like. Therefore, the cost performance of the whole system is low.

A subject of the present invention is, related to a bidirectional communication control system, to reduce the processing load of the CPU to achieve an appropriate circuit scale of the whole system.

SUMMARY OF THE INVENTION

An object of the present invention is to provide an architecture which aims to reduce the processing load of a CPU, thereby making it possible to use a less expensive CPU, and reduce the circuit scale of the whole system, and to provide an apparatus in which a higher functional process can be performed by adding a new function while maintaining CPU performance, thereby increasing the cost performance of the whole system.

The bidirectional communication control apparatus of the present invention comprises a CPU, a storage apparatus, a CPU bus, and the like, and in addition, a downstream data processing block of performing data processing of downstream data transmitted from a center apparatus to a terminal apparatus, and an upstream data processing block of performing data processing to generate upstream data to be transmitted from the terminal apparatus to the center apparatus. The downstream data processing block and the upstream data processing block perform data transmission/reception with respect to each other.

Thereby, it is possible to perform a process which is otherwise performed by only a CPU, using the downstream data processing block and the upstream data processing block while bypassing the CPU bus and the CPU, so that the traffic intensity of the CPU bus can also be reduced. Therefore, the efficiency of data processing can be improved even when a general-purpose CPU which only requires practical cost is used. When CPU performance is maintained, a higher functional process can be performed by adding a new function, thereby increasing the cost performance of the whole system.

A data processor having a register which is connected to the CPU bus, the upstream data processing block, and the downstream data processing block while bypassing a bus data arbitration process, or a second storage apparatus which is connected to the CPU bus (or a first storage apparatus), the upstream data processing block, and the downstream data processing block while bypassing a bus data arbitration process, is additionally provided, thereby making it possible to further reduce the traffic intensity of the CPU bus.

A third storage apparatus having a function of temporarily storing data, which is connected to the upstream data processing block, the downstream data processing block, and the second storage apparatus, a control block of controlling output/input of data with respect to the second storage apparatus and the third storage apparatus, which is connected to the upstream data processing block, the downstream data processing block, the second storage apparatus, the third storage apparatus, and the data processor, and the like are further provided, thereby making it possible to achieve a considerably quick process.

Particularly, in the upstream data processing block, addition of a concatenated frame header or a concatenation process of frame data itself is performed while performing direct transmission/reception with respect to the downstream data processing block, and/or, a circuit of performing addition of a divided frame header or a division process of frame data itself is provided, thereby making it possible to correctly and quickly know a request from the center apparatus by referencing processing contents contained in downstream data or a status of a downstream process itself while bypassing the CPU, and also speed up feedback to an upstream process. As a result, a high-speed process can be performed.

Particularly, in the downstream data processing block, basic processes, such as syntax analysis, header analysis, data format conversion, and the like, are performed while performing direct transmission/reception with respect to the upstream data processing block, thereby making it possible to correctly and quickly perform a process by referencing processing contents contained in upstream data or a status of an upstream process itself while bypassing the CPU.

Also, a tuner, a downstream PHY block, an upstream PHY block, a back-end section, and the like can be further provided.

The bidirectional communication control method of the present invention includes performing a downstream data process and an upstream data process while performing transmission/reception of contents of data of each other.

With this method, it is possible to perform a downstream data process and an upstream data process without using the CPU bus, thereby making it possible to reduce the traffic intensity of the CPU bus.

According to the present invention, it is possible not only to reduce the processing load of the CPU but also to significantly reduce the traffic intensity of the CPU bus, so that the transfer rate of the bidirectional communication control apparatus (also called an MAC section) can be significantly increased. In addition, a high-performance CPU does not have to be used, thereby not only reducing the circuit scale of the whole bidirectional communication system but also achieving a reduction in operating frequency of the circuit and low power consumption. Also, it is no longer necessary to take measures for heat radiation.

On the other hand, even when the performance of a CPU is maintained or improved, the present invention has the effect of increasing the transfer rate without depending on the CPU, for example. Therefore, a portion of the function of the CPU can be used for other process purposes, so that an additional function can be added to the bidirectional communication control apparatus and a peripheral function can be incorporated, i.e., a synergistic effect can be expected to further improve the performance.

DESCRIPTION OF THE PREFERRED EMBODIMENTS

First Embodiment

Whole Structure

Figure 1:
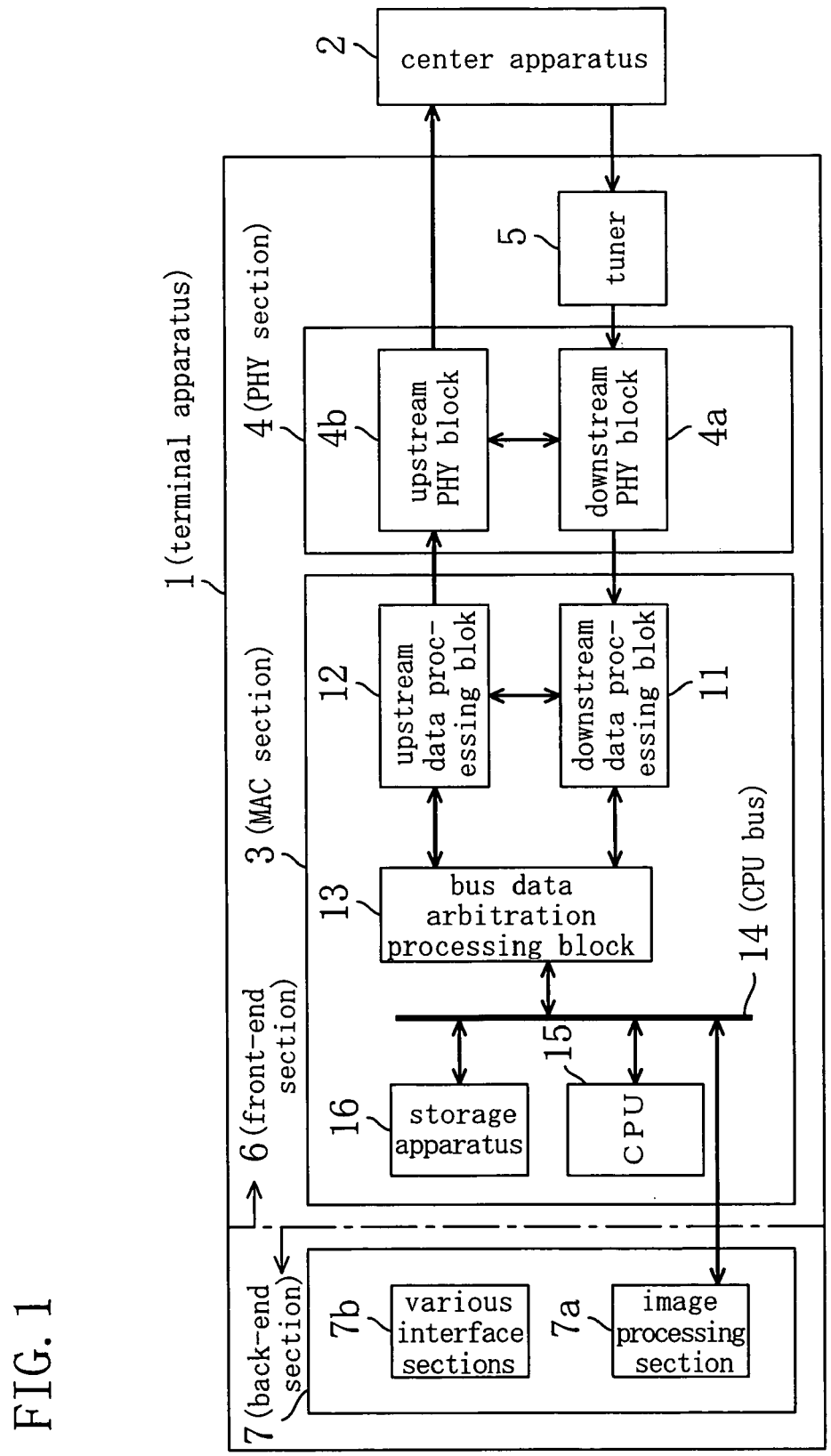
FIG. 1 is a block circuit diagram illustrating a structure of a communication system for use in digital bidirectional communication according to a first embodiment.

FIG. 1 is a block circuit diagram illustrating a structure of a communication system for use in digital bidirectional communication according to a first embodiment. As illustrated in FIG. 1, the communication system comprises a terminal apparatus 1 which performs digital bidirectional communication with a center apparatus 2. The terminal apparatus 1 comprises an MAC (Media Access Control) section 3 (digital bidirectional communication apparatus) having an MAC function, a PHY section 4 which subjects upstream data, such as video, audio, control data, or the like, which is transmitted from the terminal apparatus 1 to the center apparatus 2, to an error correction code encoding process before performing modulation to transmit an RF signal, a tuner 5 which receives the RF signal containing video, audio, transmission control data, or the like transmitted from the center apparatus 2 and converts it into an IF signal, and an back-end section 7 which comprises an image processing section 7a and various interface sections 7b. The PHY section 4 has a downstream PHY block 4a and an upstream PHY block 4b. The MAC section 3 processes, as appropriate, downstream data which is to be demodulated in the PHY section 4 and upstream data which is to be modulated in the PHY section 4 to produce various image data or audio data, transfer image data or audio data, or communication control data from the center apparatus 2, or control bidirectional communication. Note that the MAC section 3, the PHY section 4, and the tuner 5 function as a front-end section 6 with respect to the back-end section 7.

The MAC section 3 comprises a downstream data processing block 11 which has a function of substituting for a portion of the process of the CPU 15, an upstream data processing block 12 which has a function of substituting for a portion of the process of the CPU 15, a bus data arbitration processing block 13, a CPU bus 14, the CPU 15, and a storage apparatus 16.

Specific processes and functions of the downstream data processing block 11 and the upstream data processing block 12 will be described in detail below.

The bus data arbitration processing block 13 performs a process of determining a bus use priority level or the like of each data to be sent onto the CPU bus 14. Data processed by the downstream data processing block 11, data processed by the CPU 15 before being transmitted to the upstream data processing block 12, and data stored in the storage apparatus 16 are all transmitted and received via the CPU bus 14. Therefore, the bus data arbitration processing block 13 performs appropriate arbitration in order to efficiently transmit and receive these data.

The storage apparatus 16 basically stores a large volume of data obtained by a downstream data process. In addition, the storage apparatus 16 is used as a data register which temporarily holds data for a software process performed by the CPU 15. The storage apparatus 16 also has a function of previously holding a key data table as reference data in order to confirm key data during an encryption or decryption process and holding a PHS index table in which a maximum value of the number of bytes to be processed during a decompression or compression process of PHS.

The CPU 15 performs various processes. Some typical ones thereof are the following. Since the plurality of terminal apparatuses 1 are connected to the single center apparatus 2, initial setting of a data communication control called "ranging" which corresponds to a synchronization process between each terminal apparatus is performed so that the center apparatus can control each terminal apparatus with correct timing. In addition to this most basic process, in an upstream data process and a downstream data process described below, an operation control is performed with respect to each functional block in the downstream data processing block 11 and each functional block in the upstream data processing block 12.

Here, as illustrated in FIG. 1, the MAC section 3, which is the bidirectional communication control apparatus of the present embodiment, is characterized by comprising the downstream data processing block 11 and the upstream data processing block 12, each of which has a function of substituting for a portion of the process of the CPU 15, and in that the downstream data processing block 11 and the upstream data processing block 12 directly transmit and receive data while bypassing the CPU bus 14.

Downstream Data Process

Figure 2:
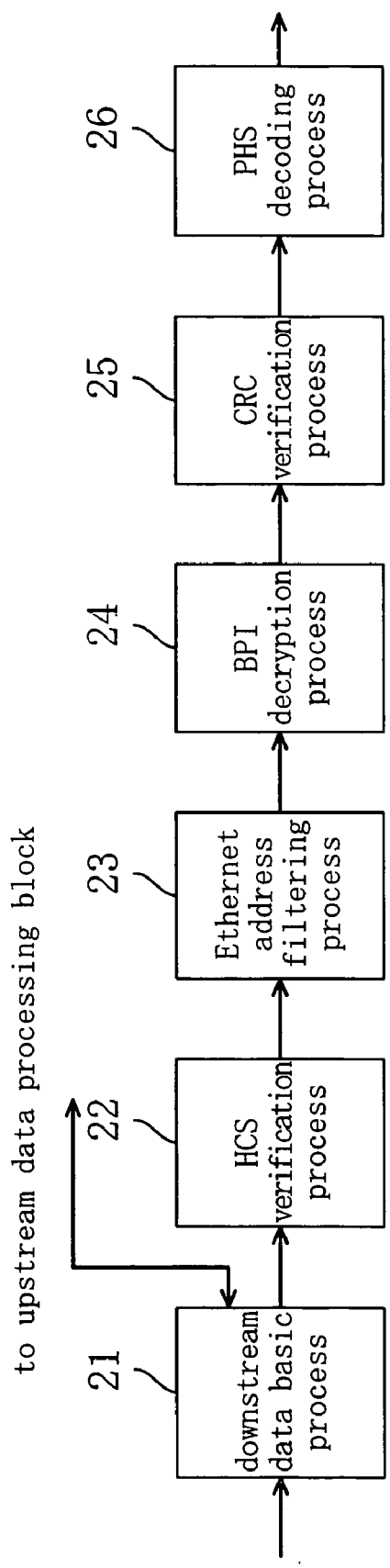
FIG. 2 is a block circuit diagram illustrating an example of each functional block provided in a downstream data processing block of the first embodiment.

FIG. 2 is a block circuit diagram illustrating an example of each functional block (circuit) provided in the downstream data processing block 11. As illustrated in FIG. 2, the downstream data processing block 11 has a downstream data basic process functional block 21, an HCS verification process functional block 22, an Ethernet address filtering process functional block 23, a BPI decryption process functional block 24, a CRC verification process functional block 25, and a PHS decoding process functional block 26.

The downstream data basic process functional block 21 performs syntax analysis, header analysis, and format conversion with respect to communication data. Specifically, a structural analysis process is performed with respect to an MPEG structure of video data, and an MAC structure which is a sublayer for a network process buried in the MPEG structure. Initially, a header portion in MPEG structure data is analyzed to extract information for extracting MAC structure data, and thereafter, the MAC structure data is actually extracted. Next, a header portion of the MAC structure data is analyzed. When an extended field called an extended header is present in addition to an ordinary header, the extended header is analyzed. The extended header contains information about the presence or absence of encryption, and in addition, information required for a cryptographic process for encryption and decryption, and information required for a process for compressing and transmitting a header of each frame called Payload Header Suppression (PHS).

Note that, when it is found that no extended header is present as a result of analysis performed by the downstream data basic process functional block 21, it is determined that the downstream data is not encrypted, and is not compressed by PHS, so that data having the MAC structure extracted from the downstream data is output as it is. On the other hand, when an extended header is present, the field having information about the presence or absence of encryption and the field having information about a PHS process are analyzed. When it is confirmed that encryption or a PHS process is absent, a process similar to that which is performed when no extended header is present is performed. When it is confirmed that encryption or a PHS process has been performed, a BPI decryption process or a PHS decoding process described below is performed.

Also, the downstream data basic process functional block 21 performs a reciprocal process with respect to the upstream data processing block 12 while performing a time stamp process with respect to data, in order to coordinate transmission and reception timing which is considerably important for bidirectional communication.

The HCS verification process functional block 22 verifies an HCS (Header Check Sequence), which is a CRC error detection code for an extended header, which is added to the extended header.

The Ethernet address filtering process functional block 23 extracts Ethernet structure data from MAC structure data and classifies various Ethernet addresses.

The BPI decryption process functional block 24 decrypts encrypted data. Decryption of encrypted data requires, for example, restoration of key data called TEK (Traffic Encryption Key) which is required for an encryption process. In order to obtain a correct TEK, the BPI decryption process functional block 26 extracts an SID (Service ID) and a key sequence number from an extended header, and based on these two data values, confirms a TEK, and thereafter, performs a decryption process with respect to DES encrypted data using the confirmed TEK itself, thereby completing the process of restoring original data.

The CRC verification process functional block 25 verifies a CRC error detection code added to ordinary data other than the extended header.

The PHS decoding process functional block 26 performs an information process required for a header data compression process. A parameter called a "PHS field" indicating a range in which all data to be subjected to the header data compression process is included, and a number called a "PHS index" corresponding to a rule for performing PHS in units of an individual frame, are assigned to the extended header. Here, the PHS rule corresponding to a PHS index is previously informed from the center apparatus by a software process of an application layer. For example, a rule that all bytes of a header are compressed, or that a header is compressed in units of one bit or in units of two bits, is previously defined. In a PHS decoding process, compressed data is restored based on these two parameters. A data range (maximum 256 bytes) in which a PHS process is being performed can be extracted based on the PHS field, and the previously defined rule can be selectively extracted with respect to data of the range indicated by the PHS field based on the PHS index. Based on these things, the PHS decoding process functional block 26 decodes the PHS-process data which is transmitted from the center apparatus.

The downstream data thus processed is subjected to an appropriate timing control in the bus data arbitration processing block 13 before being sent onto the CPU bus 14, and thereafter, is stored into the storage apparatus 16. The data is stored for an appropriate period of time before being transferred to the CPU 15, in which the data is in turn subjected to a software process which is a process of a layer upper than an MAC layer in a network communication protocol (e.g., QoS (Quality of Service), etc.). Alternatively, the data is sent onto the CPU bus 14 again, and thereafter, is subjected to an upstream data process.

Figure 3:
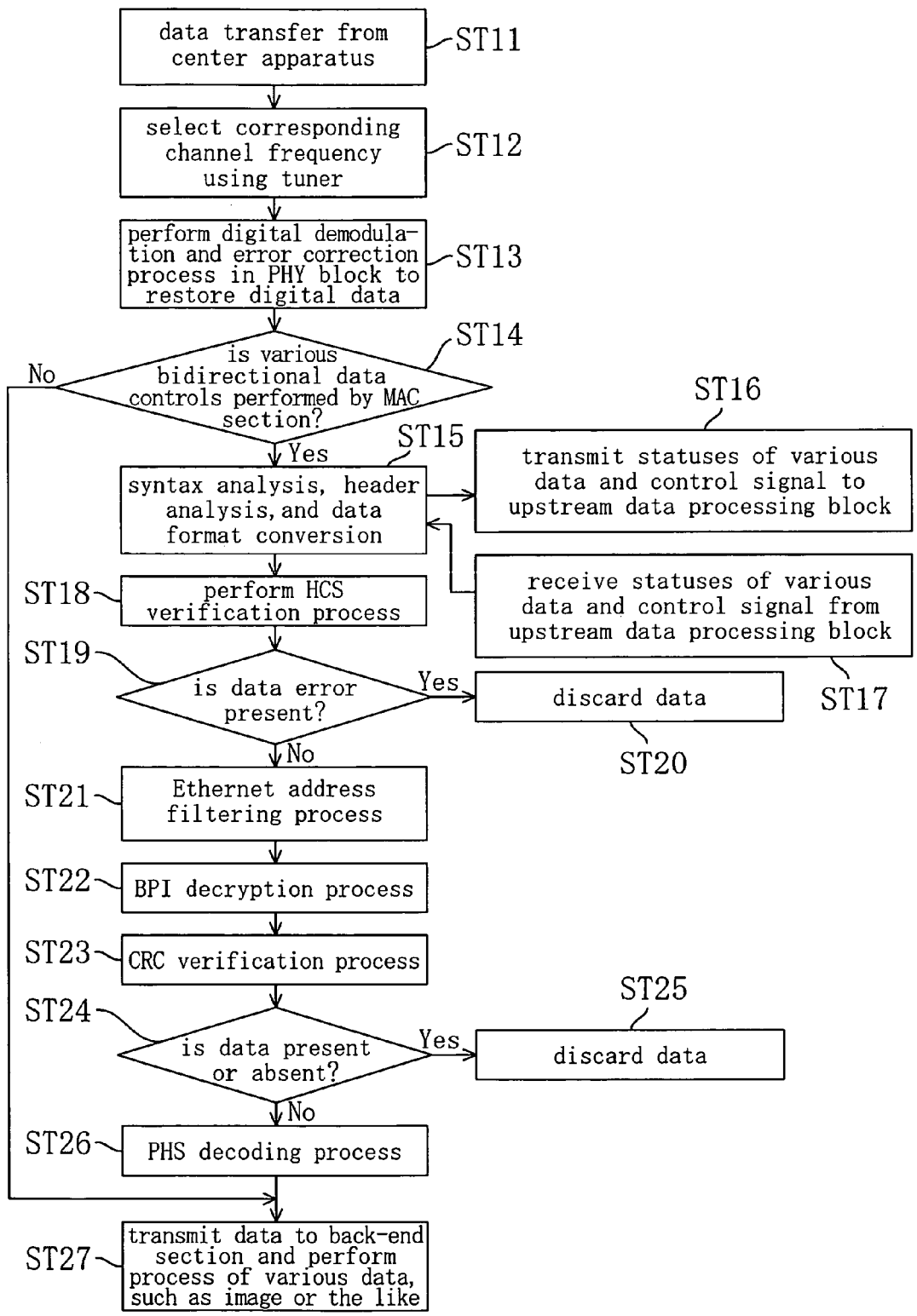
FIG. 3 is a flowchart illustrating steps of a downstream data process in the first embodiment.

FIG. 3 is a flowchart illustrating steps of a downstream data process of the terminal apparatus 1 according to the first embodiment.

In step ST11, communication data is transferred from the center apparatus 2. Thereafter, in step ST12, the tuner 5 selects a channel frequency corresponding to the communication data.

Next, in step ST13, the communication data is subjected to a digital demodulation process and an error correction process to restore digital data in the downstream PHY block 4a.

Next, in step ST14, the CPU 15 determines whether or not each bidirectional data control is to be performed in the MAC section 3. When the result of the determination is Yes (the bidirectional data control is to be performed), processes of step ST15 or later are performed in the MAC section 3. On the other hand, when the result of the determination is No (the bidirectional data control is not to be performed), the process jumps to step ST27 without performing a process in the MAC section 3.

Next, in step ST15, the downstream data basic process functional block 21 performs syntax analysis, header analysis, and data format conversion. In addition, the downstream data basic process functional block 21 performs a process of transmitting a status of each data and a control signal to the upstream data process side (step ST16), and a process of receiving a status of each data and a control signal from the upstream data process side (step ST17).

Next, in step ST18, the HCS verification process functional block 22 performs the above-described HCS verification process. Thereafter, in step ST19, it is determined whether or not the communication data has an error. When it is determined that the communication data has an error, the process goes to step ST20 in which the communication data is discarded. On the other hand, when it is determined that the communication data does not have an error, processes of step ST21 or later are performed.

Next, in step ST21, the Ethernet address filtering process functional block 23 performs the above-described Ethernet address filtering process.

Next, in step ST22, the BPI decryption process functional block 24 performs the above-described BPI decryption process, and thereafter, in step ST23, the CRC verification process functional block 25 performs the above-described CRC verification process.

Next, in step ST24, the CPU 15 determines whether or not the communication data has an error. When it is determined that the communication data has an error, the process goes to step ST25 in which the communication data is discarded. On the other hand, when it is determined that the communication data does not have an error, a process of step ST26 is performed.

In step ST26, the PHS decoding process functional block 26 performs the above-described PHS decoding process. Thereafter, the process goes to step ST27 in which the communication data is transmitted to the back-end section 7, and various data (e.g., an image, etc.) is processed in the back-end section 7.

Upstream Data Process

Next, a functional block of the upstream data processing block 12 will be described. Upstream data which is video and transmission control data transmitted from the terminal apparatus 1 to the center apparatus 2 is generated based on data subjected to the software process in CPU 15 or data stored in the storage apparatus 16. Specifically, data subjected to the software process in CPU 15 or data stored in the storage apparatus 16 is transmitted via the CPU bus 14 to the upstream data processing block 12 with appropriate timing by a control of bus data arbitration processing block 13, and is processed in the upstream data processing block 12, thereby generating upstream data.

As basic processes of the upstream data processing, addition of an error detection code, such as a CRC or the like, addition of various headers and extended headers for indicating the MAC structure, data compression by a PHS process, data encryption, and the like are performed. Further, as processes specific to upstream, a fragmentation process and a concatenation process are performed. As is different from downstream, in upstream, a plurality of terminal apparatuses simultaneously perform communication in a narrow band, so that it is often that a sufficient transfer rate cannot be secured. In order to overcome this, a mechanism of dividing large-size data into portions having an appropriate size, and a mechanism of transmitting some pieces of small-size data which have an appropriate total size, together, are incorporated. The fragmentation process means that communication data is divided into portions having an appropriate size in the terminal apparatus 1, depending on communication with the center apparatus 2. The concatenation process (concatenated frame process) means that data are brought together into an appropriate size.

Figure 4:
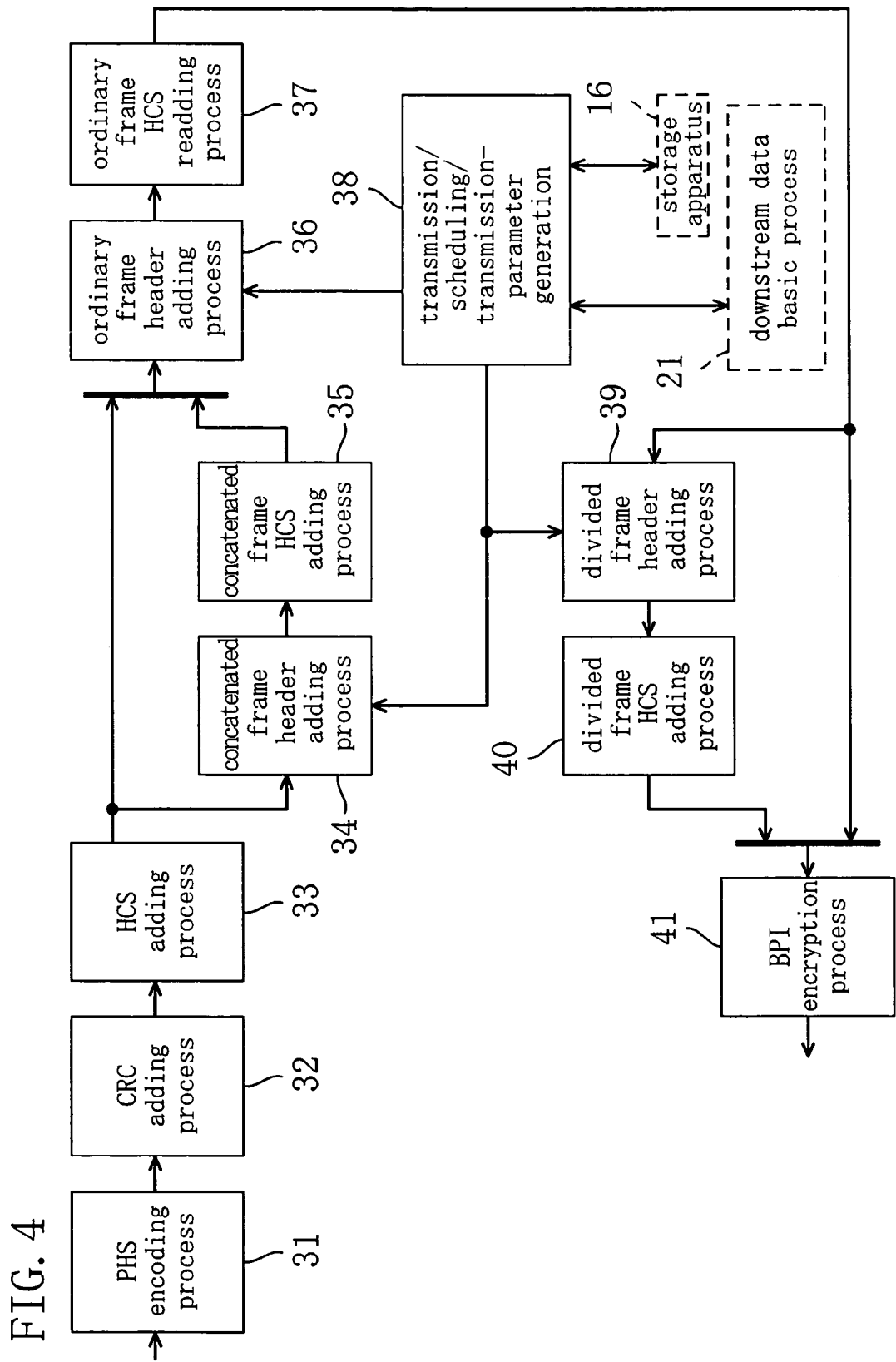
FIG. 4 is a block circuit diagram illustrating an example of each functional block provided in an upstream data processing block of the first embodiment.

FIG. 4 is a block circuit diagram illustrating an example of each functional block (circuit) provided in the upstream data processing block 12. As illustrated in FIG. 4, the upstream data processing block 12 comprises a PHS encoding process functional block 31 which encodes PHS which is information required for compression and transmission of data, a CRC adding process functional block 32 which adds a CRC error detection code to ordinary data other than a header, an HCS adding process functional block 33 which adds HCS which is a CRC error detection code for an extended header to the extended header, a Concatenated frame header adding process functional block 34 which adds a concatenated frame header (concatenation header), a concatenated frame HCS adding process functional block 35 which adds an HCS for a concatenated frame header, an ordinary frame header adding process functional block 36 which adds an ordinary frame header, an ordinary frame HCS readding process functional block 37 which readds an ordinary frame HCS, a transmission/scheduling/transmission-parameter generation functional block 38 which performs transmission of upstream data, scheduling, and generation of a transmission parameter, a divided frame header adding process functional block 39 which adds a divided frame header (fragmentation header), a divided frame HCS adding process functional block 40 which adds a divided frame HCS, and an BPI encryption process functional block 41.

Figure 5:
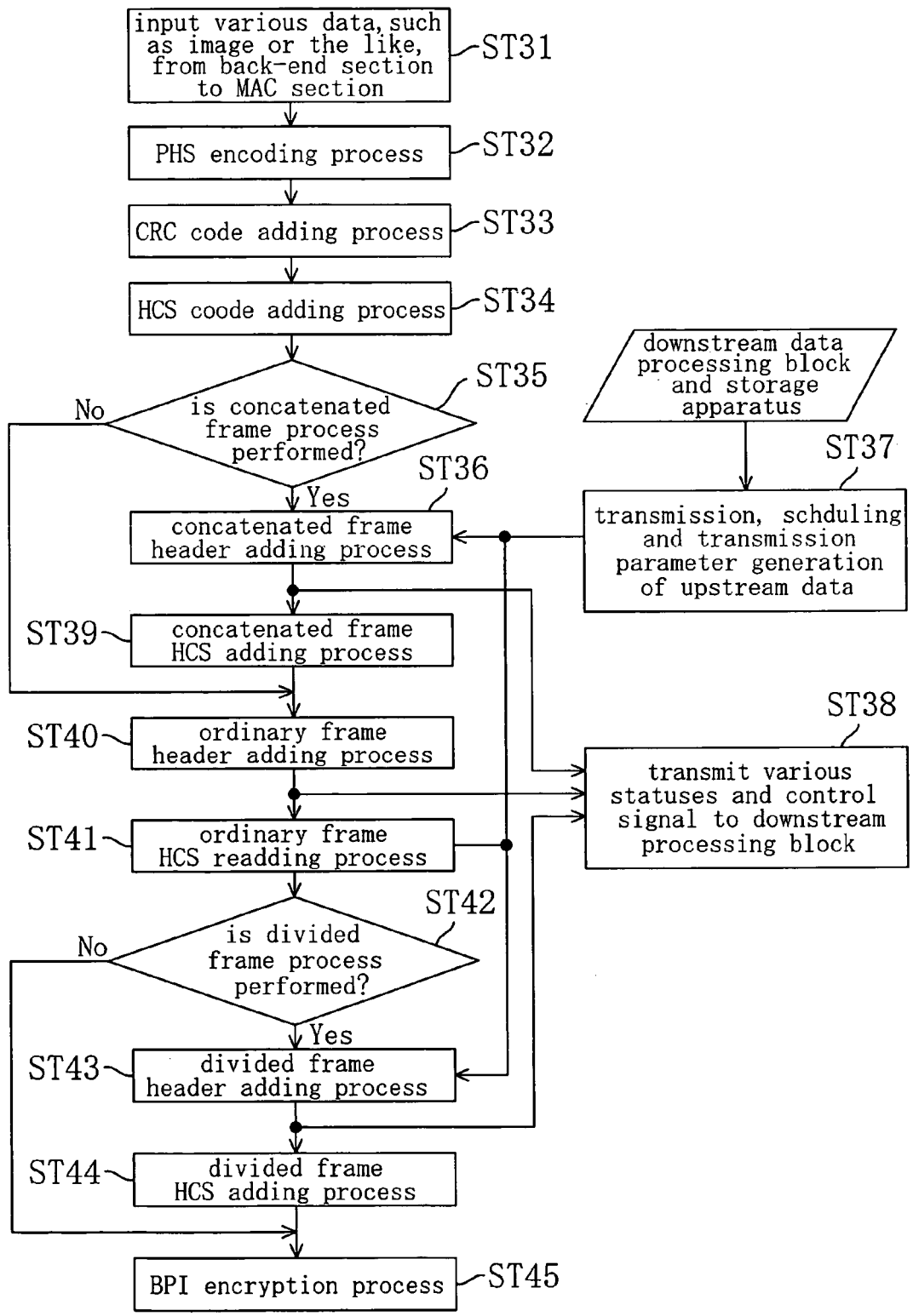
FIG. 5 is a flowchart illustrating steps of the upstream data process of the first embodiment.
Figure 12A:
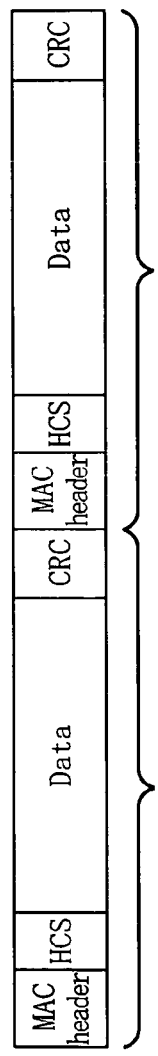
FIGS. 12A and 12B are diagrams illustrating a structure of an ordinary frame before a concatenated frame process is performed, and a structure of a concatenated frame after a concatenated frame process is performed, respectively, in the first embodiment.
Figure 12B:
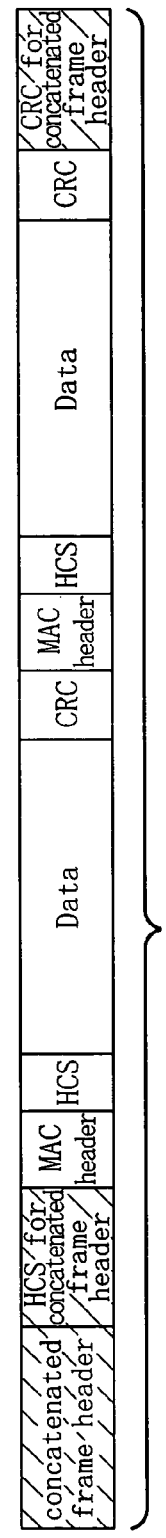
Figure 13A:
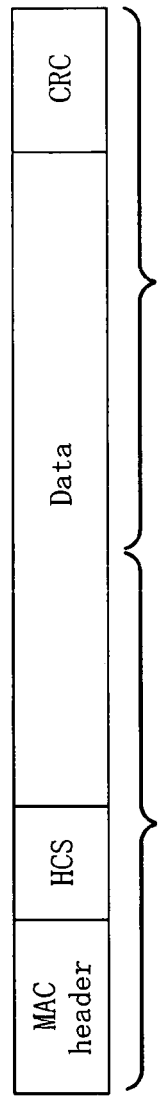
FIGS. 13A and 13B are diagrams illustrating a structure of an ordinary frame before a divided frame process is performed, and a structure of a divided frame after a divided frame process is performed, respectively, in the first embodiment.
Figure 13B:
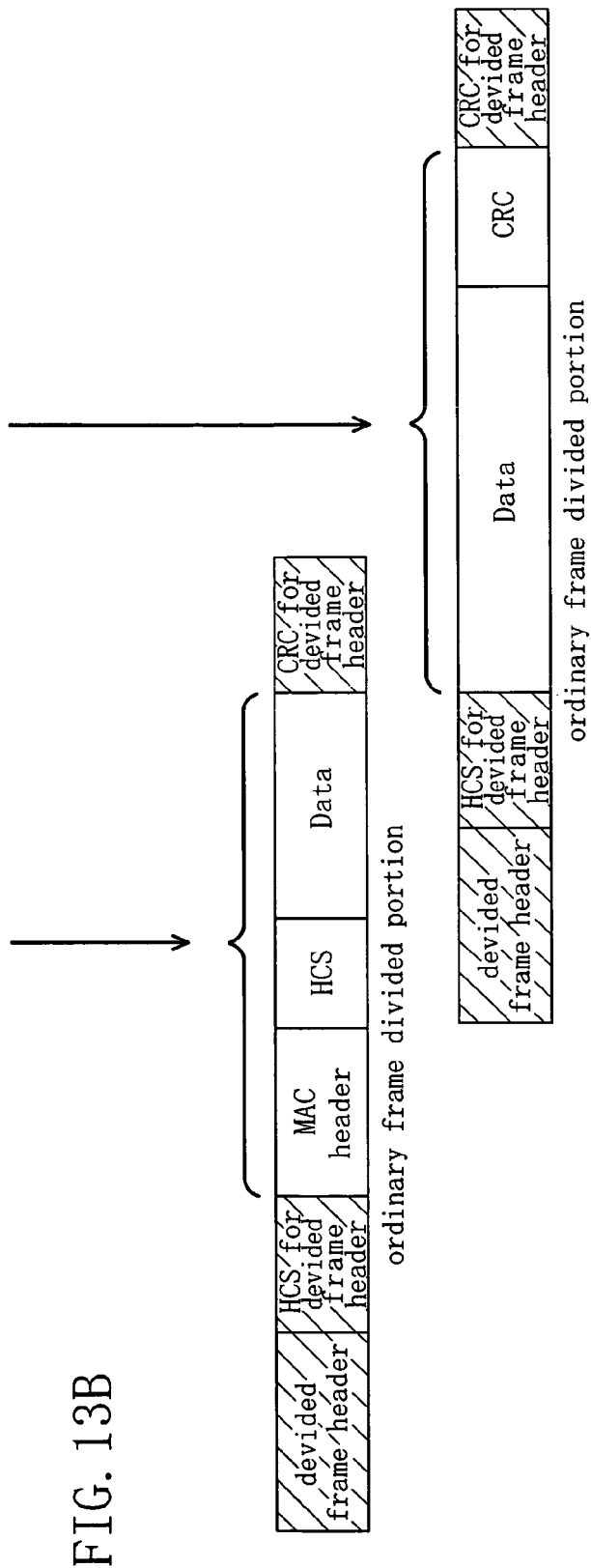

FIG. 5 is a flowchart illustrating steps of an upstream data process. FIGS. 12A and 12B are diagrams illustrating a structure of an ordinary frame before a concatenated frame process, and a structure of a concatenated frame after a concatenated frame process. FIGS. 13A and 13B are diagrams illustrating a structure of an ordinary frame before a divided frame process, and a structure of a divided frame after a divided frame process. Although FIGS. 12A and 12B illustrate exemplary concatenation of two ordinary frames and FIGS. 13A and 13B illustrate exemplary division of an ordinary frame into two, three or more ordinary frames may be concatenated and an ordinary frame may be divided into three or more.

Hereinafter, an upstream data process will be described in accordance with the flowchart of FIG. 5 with reference to FIGS. 12A and 12B and FIGS. 13A and 13B. Here, attention is paid to that the amount of data processed by an upstream data process is smaller than that of a downstream data process, and that the processing speed of a real-time process of an upstream data process is slower than that of a downstream data process, and an example that data is input which has been subjected in the CPU 15 to a process other than addition of an error correction code and an encryption process which generally cause a particularly large increase in the load of CPU, will be described.

In step ST31, various data (e.g., an image, etc.) is input from the back-end section 7 to the MAC section 3. In step ST32, the PHS encoding process functional block 31 analyzes a structure of the input data to determine a header, an extended header, and ordinary data, and determines a PHS field which defines a range within which PHS is performed, and a PHS index corresponding to the contents of a process which define what kind of compression is to be performed, in the input data, and thereafter, performs an actual PHS encoding process.

Thereafter, in step ST33, the CRC adding process functional block 32 adds a CRC error detection code to ordinary data other than the header. In step ST34, the HCS adding process functional block 33 adds an HCS code, which is a CRC error detection code for an extended header, to the extended header. In a terminal apparatus, a plurality of SIDs are generally handled simultaneously. Specifically, since a plurality of pieces of data are simultaneously handled, the CRC code adding process in step ST33 and the HCS code adding process in ST34 are processed in parallel.

Next, in step ST35, the CPU 15 checks whether or not the center apparatus 2 requests a concatenated frame process (concatenation process). When concatenation is requested (Yes), the size of data to be processed is checked. In this case, when the data size is smaller than that which is requested by the center apparatus 2, a concatenated frame process is performed. Specifically, data is gathered until the size of the data reaches a value which is approximate to, but does not exceed, the data size requested by the center apparatus 2. Specifically, for example, a concatenated frame process which concatenates two ordinary frames illustrated in FIG. 12A into a single concatenated frame illustrated in FIG. 12B, is performed.

When the size of data becomes an appropriate value, the concatenation process is ended. In step ST36, a concatenated frame header (concatenation header) indicating the contents of the process thus performed (see FIG. 12B). In this case, in step ST37, the transmission/scheduling/transmission-parameter generation functional block 38 performs data transmission/reception with respect to the downstream data processing block 11, and performs data transmission/reception with respect to the storage apparatus 16 via the bus data arbitration processing block 13 and the CPU bus 14. Thereafter, the process of step ST36 is performed, depending on the contents of a process, such as transmission, scheduling, generation of a transmission parameter, or the like, of upstream data in step ST37.

Next, in step ST39, as illustrated in FIG. 12B, the concatenated frame HCS adding process functional block 35 calculates and adds an HCS for a concatenated frame header, and adds a CRC (error correction code) for concatenated frame data after a concatenated frame process.

Next, after steps ST36 and ST37 are ended, or when it is determined in step ST35 that a concatenated frame process is not performed (No), the ordinary frame header adding process functional block 36 performs, in step ST40, an ordinary frame header adding process, depending on the process in step ST37. On the other hand, when a concatenated frame process is not required, unprocessed data is used in the next process.

In step ST41, the ordinary frame HCS readding process functional block 37 performs an ordinary frame HCS readding process.

Next, in step ST42, the CPU 15 determines whether or not the center apparatus 2 requests a divided frame process (fragmentation). When a divided frame process is required (Yes), the process goes to step ST43, the size of data to be processed is checked, and data is divided into portions having a size requested by the center apparatus. Specifically, a divided frame process in which one ordinary frame of FIG. 13A is divided into two ordinary frame divided portions of FIG. 13B, is performed. Thereafter, the divided frame header adding process functional block 39 adds the divided frame header of FIG. 13B to each divided ordinary frame divided portion. In this case, the process of step ST43 is performed, depending on the contents of a process, such as transmission of upstream data, scheduling, generation of a transmission parameter, or the like in step ST37. Also, in step ST44, an HCS for a divided frame header (fragment header) is added, and at the same time, a CRC for a divided frame data is added. On the other hand, when a divided frame process is not required, unprocessed data is used.

When steps ST36, ST40, and ST43 are each ended, various status and control signals are transmitted to the downstream data processing block 11 in step ST38.

Finally, in step ST45, the data to which an error correction code is added as described above is encrypted. In the encryption process, as is similar to the downstream data process, initially, an SID and a key sequence number are confirmed in order to confirm whether or not key data to be encrypted is correct, and thereafter, based on the key data, an encryption process is performed with respect to DES encrypted data. In this manner, encrypted data is transmitted to the center apparatus while determining appropriate timing of data transmission with reference to a time stamp process which is performed in the downstream data process.

According to the bidirectional communication control apparatus of the present embodiment, since the downstream data processing block 11 and the upstream data processing block 12 are provided in the MAC section 3 of the terminal apparatus 1, the CPU 15 does not have to perform a process which is performed by a CPU in conventional bidirectional communication apparatuses, so that the load of the CPU 15 is significantly reduced. Also, although frequent data communication needs to be performed via a CPU bus between a CPU and a storage apparatus in conventional bidirectional communication apparatuses (MAC section), communication data is processed in the downstream data processing block 11 and the upstream data processing block 12 without data transmission on the CPU bus 14 according to the present embodiment. Therefore, the efficiency of data processing can be improved even when a general-purpose CPU which only requires practical cost is used.

Since no high-performance CPU is required, the circuit scale of the whole communication system is not only reduced, but also the operating frequency of the circuit can be reduced and low power consumption can be achieved, so that it is no longer necessary to take measures for heat radiation.

On the other hand, even when CPU performance is maintained or improved, the transfer rate can be improved by the bidirectional communication control apparatus (MAC section) of the present embodiment without depending on the CPU, for example. Therefore, a portion of the function of the CPU can be used for other process purposes, so that an additional function can be added to the bidirectional communication control apparatus and a peripheral function can be incorporated, i.e., a synergistic effect can be expected to further improve the performance.

Particularly, in the MAC section 3, since the concatenated frame header adding process circuit 34 and the divided frame header adding process circuit 39 are provided, a data process can be quickly performed by bypassing the CPU 15 without sequential communication with the CPU. Therefore, a time required to wait for a command from the CPU before preparing a data transmission format can be overwhelmingly reduced. As a result, the data transfer rate can be improved. Also, when the contents of the process of the downstream data processing block 11 or the contents corresponding to a request from the center apparatus are extracted from downstream data, and a process is performed, depending on the result, a process can be in real time without a time required to wait for communication with the CPU. Therefore, not only the transfer rate but also the precision and accuracy of the process can be improved.

In addition, the downstream data basic process circuit 21 which performs syntax analysis, header analysis, data format conversion, and the like is provided in the MAC section 3. Therefore, as is converse to the above-described process, it is possible to accurately reflect contents corresponding to the contents of the process of the upstream data processing block 12 on a downstream process while bypassing the CPU 15 while holding real-time performance, resulting in a quick and accurate process.

Comparison of First Embodiment and Conventional Bidirectional Communication Control Apparatus In the present invention, the number of processes requiring bus arbitration is significantly reduced, so that the transfer rate increases, in the downstream and upstream processes. This will be described by way of an example using a flowchart relating to the downstream process of FIG. 3.

Figure 14:
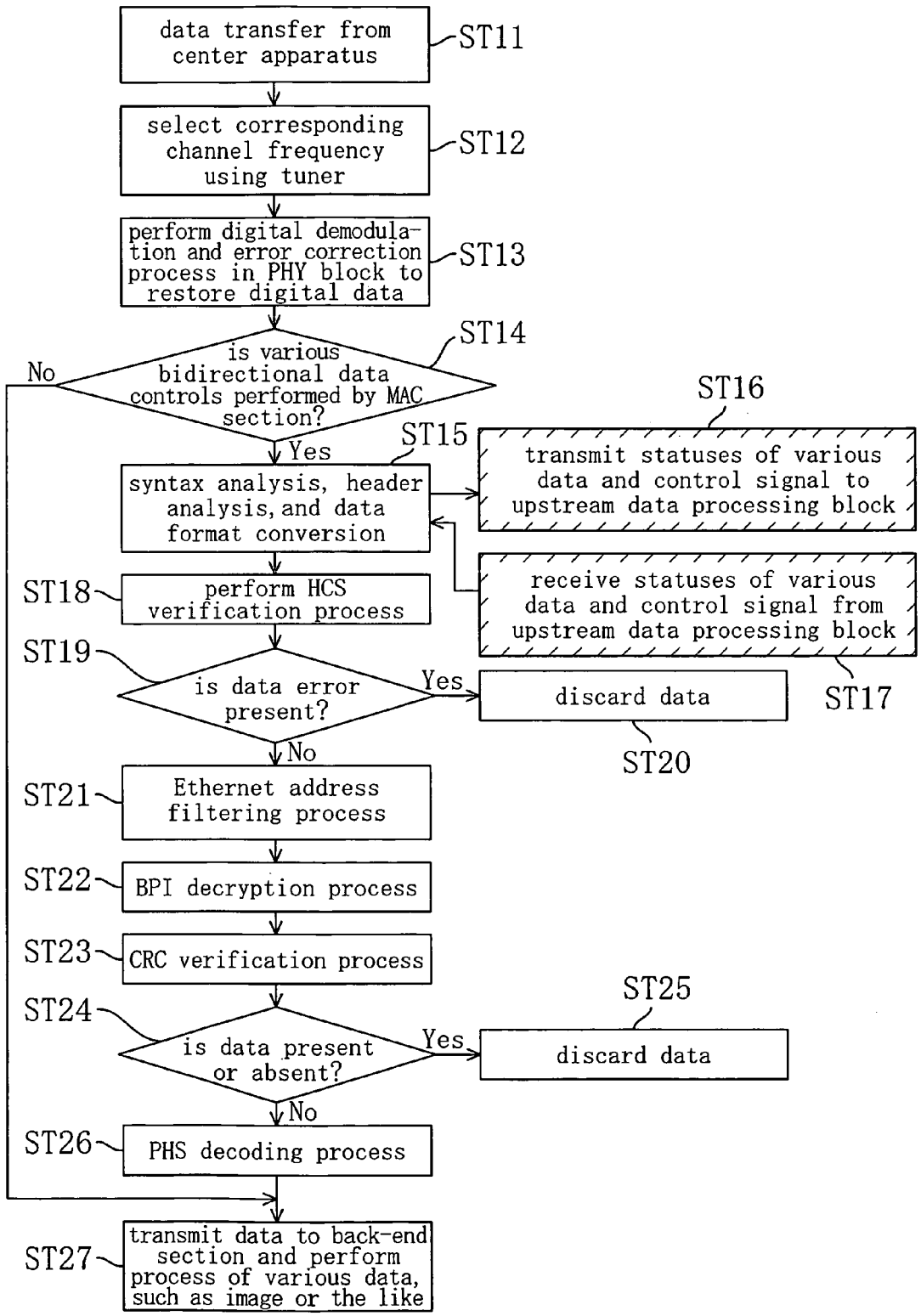
FIG. 14 is a flowchart obtained by shadowing steps requiring bus arbitration performed by a CPU in the flowchart of the first embodiment of FIG. 3.
Figure 15:
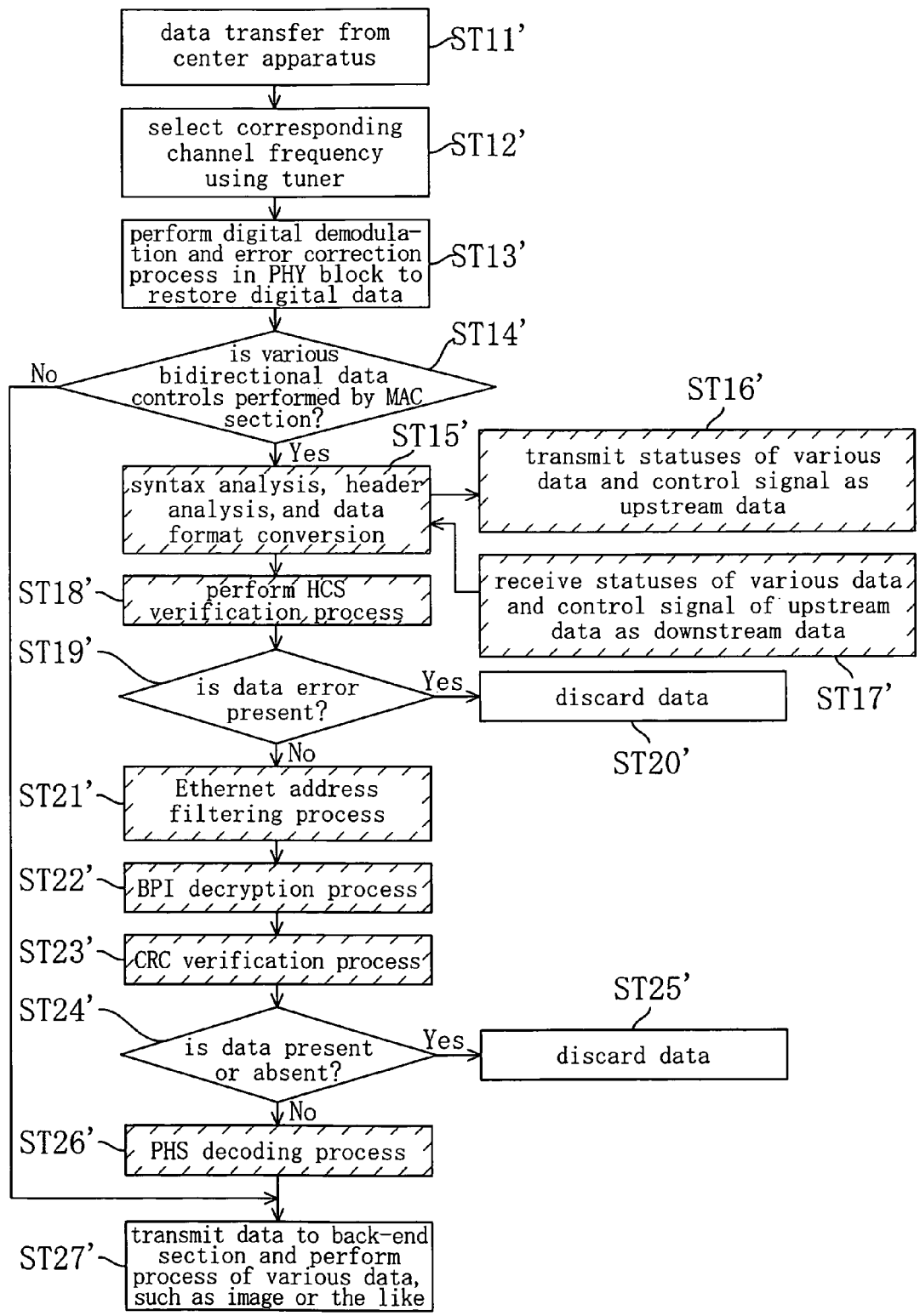
FIG. 15 is a flowchart obtained by shadowing steps requiring bus arbitration performed by a CPU in control of a conventional bidirectional communication control apparatus corresponding to that of the flowchart of FIG. 3.

FIG. 14 is a flowchart obtained by shadowing steps requiring bus arbitration performed by the CPU in the flowchart of the present embodiment of FIG. 3. FIG. 15 is a flowchart obtained by shadowing steps requiring bus arbitration performed by the CPU in control of a conventional bidirectional communication control apparatus corresponding to that of the flowchart of FIG. 3.

As illustrated in FIG. 14, in the present invention, the upstream data processing block 12 and the downstream data processing block 11 are provided as dedicated blocks, whereby all processes can be basically performed by respective corresponding dedicated data processing blocks. Therefore, it is not necessary to use a CPU so as to perform each process, so that substantially no bus arbitration processes for trying to efficiently transfer data between a CPU and a storage apparatus are basically required. Specifically, as illustrated in FIG. 14, all steps of the downstream data process are successively processed by respective dedicated processing blocks in real time, whereby only a few shadowed steps requiring bus arbitration are present. Note that control steps (steps ST16 and ST17) for communicating data with the upstream data processing block 12 of FIG. 1 cannot be performed by only respective dedicated data processing blocks, and a control of the CPU 15 is required. In this case, bus arbitration is required between the CPU, the storage apparatus, the upstream data processing block 12, and the downstream data processing block 11.

On the other hand, as illustrated in FIG. 15, when a conventional bidirectional communication control apparatus is used, since no dedicated data processing blocks are processed, the CPU basically performs all processes. Therefore, in a downstream data process requiring a real-time process, processes requiring a considerably large processing amount, such as syntax analysis (step ST15'), an HCS process (step ST18'), a BPI decryption process (step ST22'), a CRC process (step ST23'), a PHS decoding process (step ST26'), and the like, require bus arbitration performed by the CPU. Although these processes put a load on the CPU, since computation of the processes is performed while performing writing and reading with respect to the storage apparatus with appropriate timing, the CPU needs to perform bus arbitration. When the conventional bidirectional communication control apparatus is used, the CPU needs to perform bus arbitration even in a process of transmitting statuses of various data of downstream data and a control signal as upstream data (step ST16'), and a process of receiving statuses of various data of upstream data and a control signal as downstream data (step ST17'). Also, when the conventional bidirectional communication control apparatus is used, the CPU needs to perform bus arbitration even in an Ethernet address filtering process (step ST21') and a transmission process to a back-end portion (step ST27').

As described above, in the present invention, by providing dedicated data processing blocks, a CPU needs to process only a portion of commands, thereby making it possible to increase the speed of the process.

Second Embodiment

Figure 6:
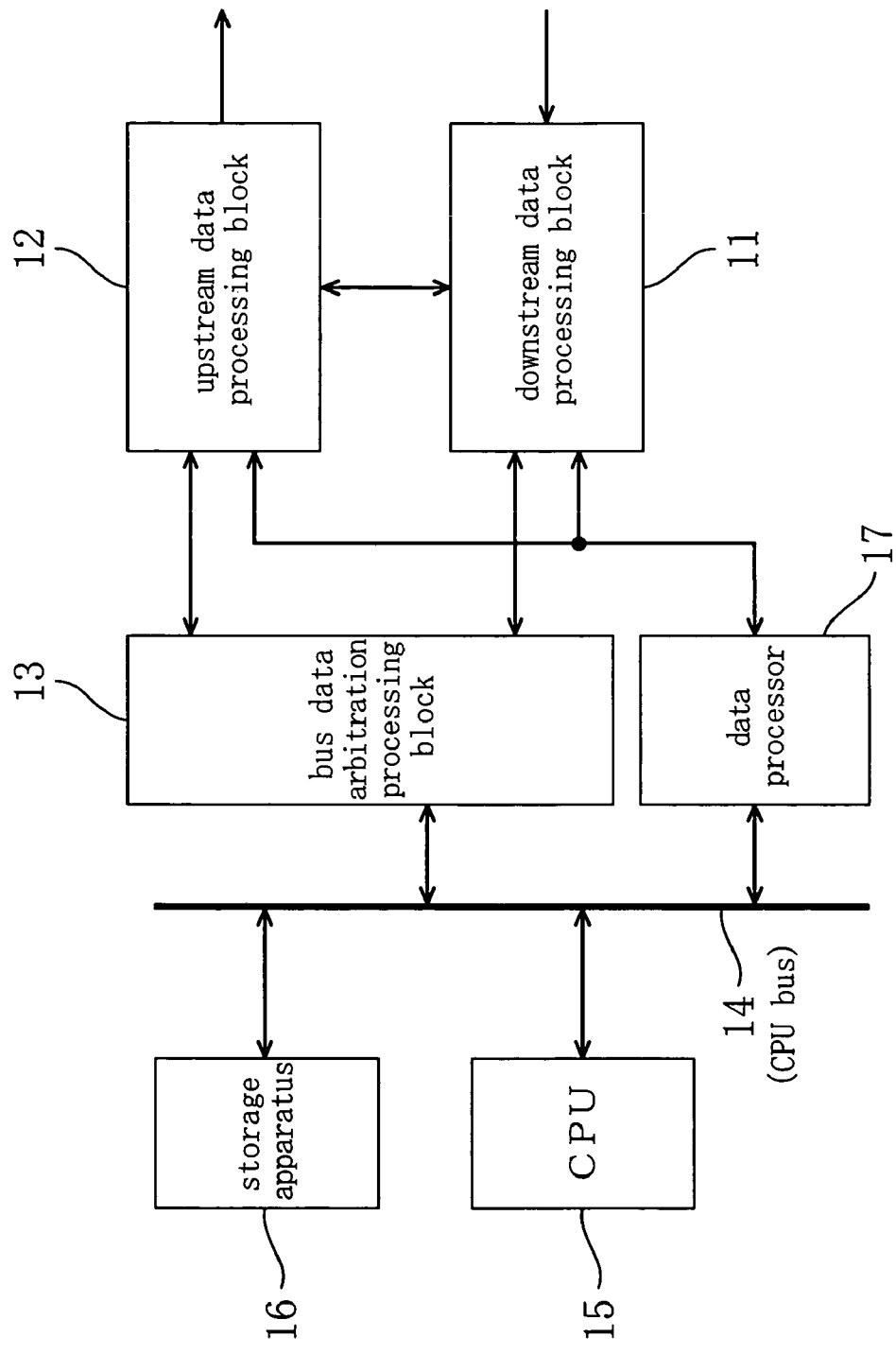
FIG. 6 is a block circuit diagram illustrating a structure of an MAC section which is a digital bidirectional communication apparatus according to a second embodiment.

FIG. 6 is a block circuit diagram illustrating a structure of an MAC section which is a digital bidirectional communication apparatus according to a second embodiment. In the present embodiment, the structure of the communication system is the same as that of the first embodiment, except for the MAC section, and the same parts will not be illustrated or explained. As illustrated in FIG. 6, the MAC section of the present embodiment comprises a data processor 17 in which a register of temporarily holding data is provided, in addition to the elements of the MAC section 3 of FIG. 1.

In the present embodiment, since the MAC section comprises the data processor 17, the following process and advantage can be achieved.

No matter how efficiently the bus data arbitration process block 13 transfers communication data, the transfer rate of the data is inevitably determined by the CPU bus 14. Therefore, the data processor 17 has a function of assisting a data transfer process by, for example, substituting for a portion of a process of the CPU 15, the function of the downstream data processing block 11 or the upstream data processing block 12 in order to reduce the traffic intensity of the CPU bus 14.

When a downstream data process is performed, also in the present embodiment, as is similar to the first embodiment, the downstream data processing block 11 performs syntax analysis with respect to downstream data to extract MAC structure data, and thereafter, performs decryption of encoded data and decompression of PHS compression, thereby restoring necessary information.

Further, in this case, in the present embodiment, the data processor 17 performs a control relating to a reciprocal process of the upstream data processing block 12 and the downstream data processing block 11. For example, a time stamp process for regulating reciprocal timing of the upstream data processing block 12 and the downstream data processing block 11, a process of attaining synchronization/ranging with other terminal apparatuses, and the like, require a complicated control, and a real-time process, such as scheduling and generation of a transmission parameter, while continuously monitoring data transmission/reception. Therefore, in the present embodiment, these processes are performed by the data processor 17 having a register function without transferring to the CPU 15 via the CPU bus 14, thereby making it possible to the traffic intensity of the CPU bus 14.

Also, when a pure upstream data process is performed, a real-time process of performing transfer between the CPU 15 and the upstream data processing block 12 with a high frequency is a process of adding a CRC in steps ST33, ST39, ST41, ST44, and the like of FIG. 5. Therefore, in the data processor 17 of the present embodiment, calculation of a CRC for an error correction code is performed, except for an HCS adding process and a data CRC adding process accompanying ordinary header addition (steps ST33 and ST34). Specifically, the process of adding an HCS for a concatenated frame header and a CRC for a concatenated frame data accompanying concatenation (concatenated frame process) of FIG. 5 (step ST39), and the process of adding an HCS for a divided frame header and a CRC for a divided frame data accompanying a divided frame process (fragmentation) (step ST44), are performed by the data processor 17 in the present embodiment. These processes are an example of processes performed by the data processor 17. The data processor 17 can perform other auxiliary processes.

According to the digital bidirectional communication apparatus of the present embodiment, the same effect as that of the first embodiment can be achieved, and in addition, a portion of the function of each of the downstream data processing block 11, the upstream data processing block 12, and the CPU 15 can be replaced with a data processor. For example, regulation of reciprocal timing between the downstream data processing block 11 and the upstream data processing block 12, and a process of adding a CRC code and an HCS can be performed by the data processor 17, thereby further reducing the load of the CPU 15 and the traffic intensity of the CPU bus 14, resulting in a further increase in the transfer rate.

Third Embodiment

Figure 7:
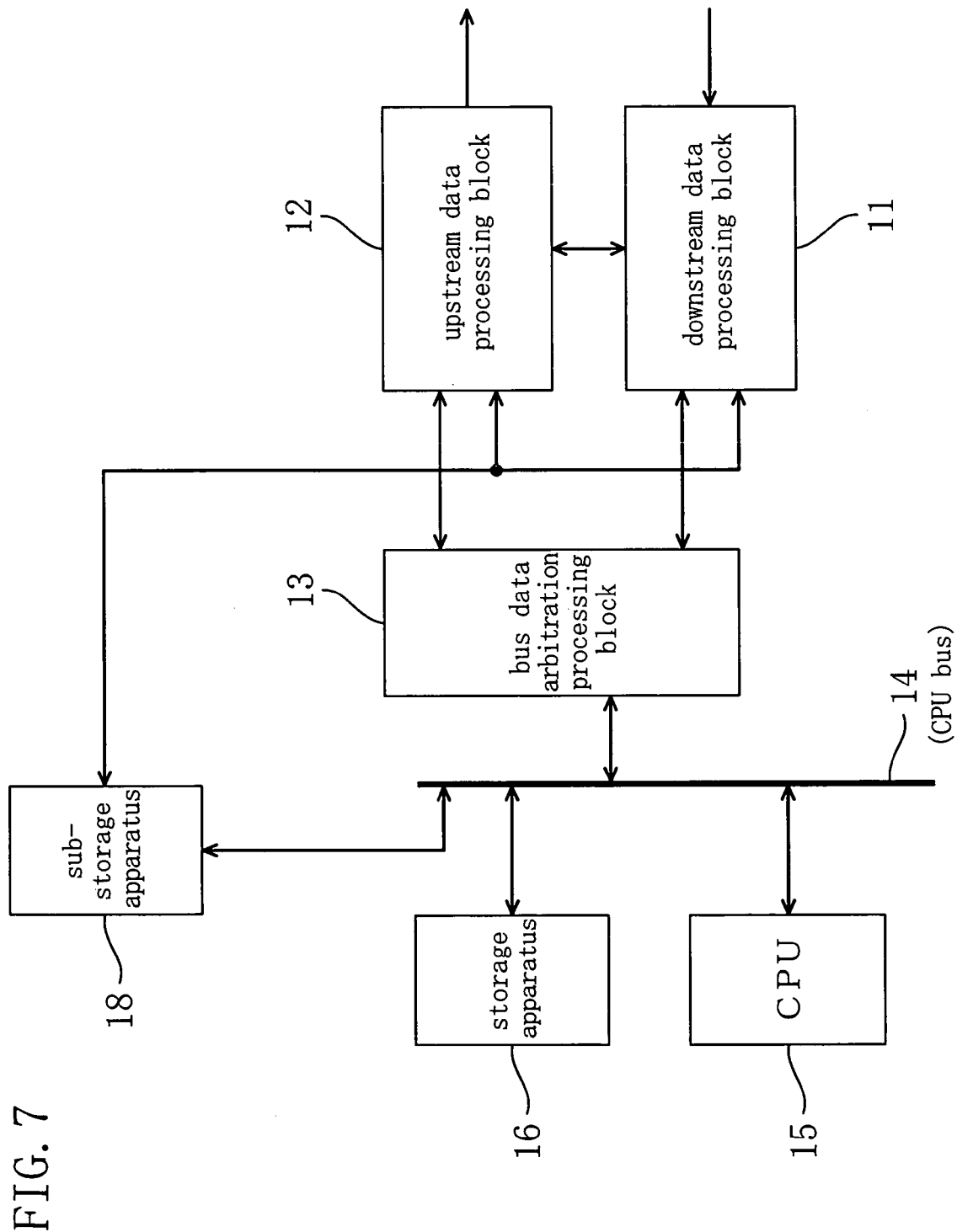
FIG. 7 is a block circuit diagram illustrating a structure of an MAC section which is a digital bidirectional communication apparatus according to a third embodiment.

FIG. 7 is a block circuit diagram illustrating a structure of an MAC section which is a digital bidirectional communication apparatus according to a third embodiment. In the present embodiment, the structure of the communication system is the same as that of the first embodiment, except for the MAC section, and the same parts will not be illustrated or explained. As illustrated in FIG. 7, the MAC section of the present embodiment comprises a sub-storage apparatus 18 in addition to the elements of the MAC section 3 of FIG. 1.

In the present embodiment, the MAC section comprises the sub-storage apparatus 18 (second storage apparatus) in addition to the storage apparatus 16 (first storage apparatus), thereby achieving the following process and advantage.

No matter how efficiently the bus data arbitration process 13 transfers communication data, the transfer rate of the data is inevitably determined by the CPU bus 14. Therefore, as is different from the second embodiment, the sub-storage apparatus 18 reduces the traffic intensity of the CPU bus 14 without a block which achieves a complicated function, such as a data processor.

When a downstream data process is performed, also in the present embodiment, as is similar to the first embodiment, the downstream data processing block 11 performs syntax analysis with respect to downstream data to extract MAC structure data, and thereafter, performs decryption of encoded data and decompression of PHS compression, thereby restoring necessary information.

Further, in the present embodiment, an SID and a key sequence number, which need to be previously held and is used in order to determine whether or not key data is correct when encrypting encrypted data, are stored in the sub-storage apparatus 18. As described above, ordinarily, in a terminal apparatus, a plurality of SIDs need to be simultaneously handled, and there are a plurality of types of encrypted data to be decrypted, so that the process of confirming the SID and the key sequence number needs to be frequently performed. However, the contents of data themselves do not need to be frequently rewritten. Therefore, in the present embodiment, data can be received from the storage apparatus 16 or the CPU 15 and stored into the sub-storage apparatus 18, via the CPU bus 14, or alternatively, data can be directly transmitted/received between the sub-storage apparatus 18 and the upstream data processing block 12 or the downstream data processing block 11. For example, in the downstream data process, data relating to a PHSF which defines a field during PHS and a PHSI which defines the maximum number of bits for PHS, as well as the SID and the key sequence number, are stored in the sub-storage apparatus 18.

Also, when an upstream data process is performed, an SID and a key sequence number which are referenced when data is encrypted, an IUC (Interval Usage Code) which serves as an index for determining the types of various processes, or various MAC addresses can be stored in the sub-storage apparatus 18, as is similar to when a downstream data process is performed. Therefore, the frequency of transmission/reception between the CPU 15 and the storage apparatus 16, and the upstream data processing block 12 can be reduced.

Specifically, by employing the sub-storage apparatus 18 (second storage apparatus) of the present embodiment, in a process which does not require a control of the CPU 15, data can be transmitted/received between the downstream data process block 11 or the upstream data processing block 12 and the sub-storage apparatus 18 while bypassing the CPU bus 14. Therefore, in addition to the effect of the first embodiment, the traffic intensity of the CPU bus 14 can be further reduced, resulting in a further improvement in the data transfer rate.

Fourth Embodiment

Figure 8:
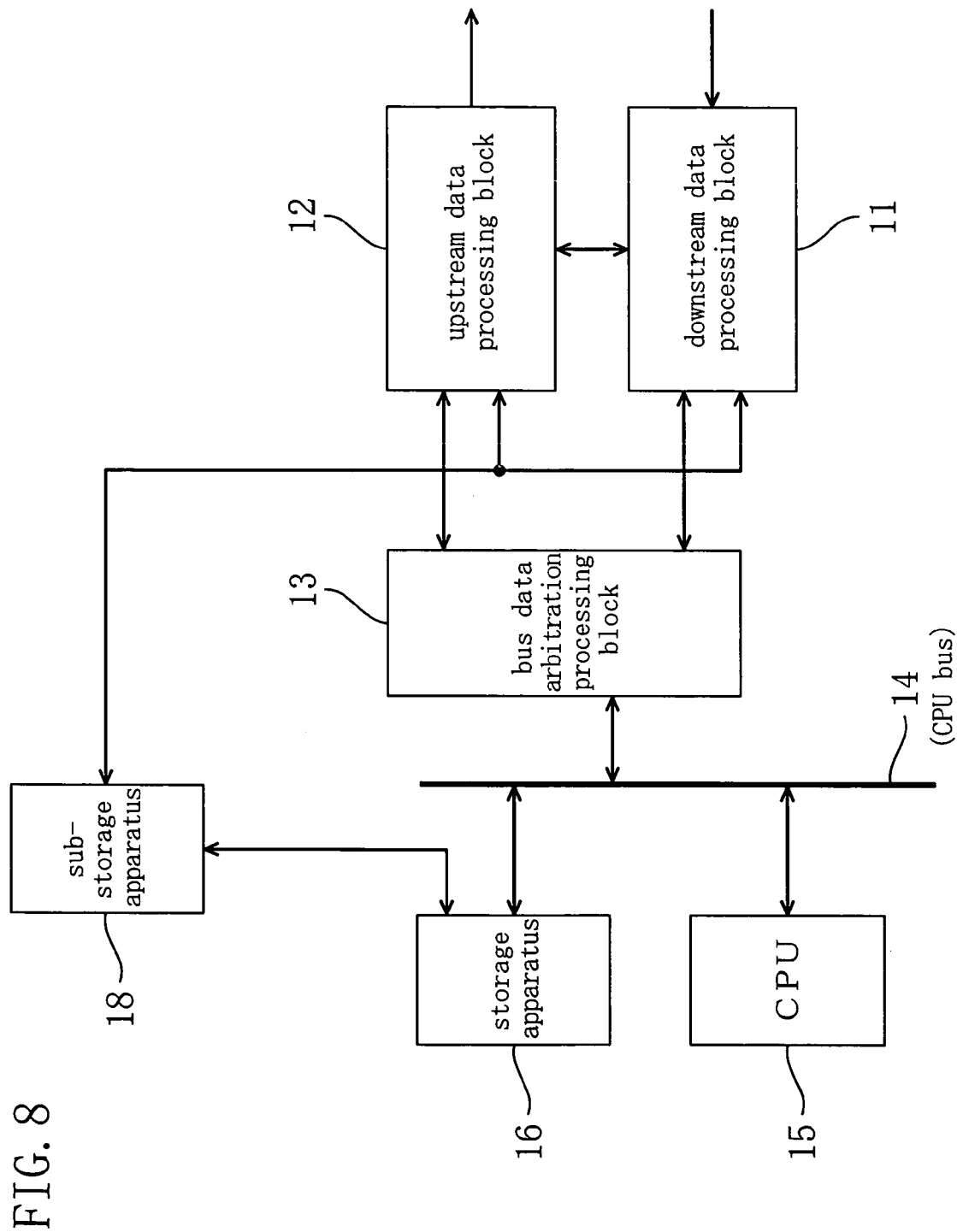
FIG. 8 is a block circuit diagram illustrating a structure of an MAC section which is a digital bidirectional communication apparatus according to a fourth embodiment.

FIG. 8 is a block circuit diagram illustrating a structure of an MAC section which is a digital bidirectional communication apparatus according to a fourth embodiment. Also in the present embodiment, the structure of the communication system is the same as that of the first embodiment, except for the MAC section, and the same parts will not be illustrated or explained. As illustrated in FIG. 8, the MAC section of the present embodiment comprises a sub-storage apparatus 18 in addition to the elements of the MAC section 3 of FIG. 1.

The digital bidirectional communication apparatus (MAC section) of the present embodiment comprises the sub-storage apparatus 18 as is similar to the third embodiment. However, although the sub-storage apparatus 18 transmits/receives data to/from the CPU 15 via the CPU bus 14 in the third embodiment, the storage apparatus 16 (first storage apparatus) and the sub-storage apparatus 18 (second storage apparatus) can directly transmit/receive data without using the CPU bus 14 in the present embodiment, so that the traffic intensity of the CPU bus 14 can be further reduced than in the third embodiment.

When a downstream data process is performed, also in the present embodiment, as is similar to the first embodiment, the downstream data processing block 11 performs syntax analysis with respect to downstream data to extract MAC structure data, and thereafter, performs decryption of encoded data and decompression of PHS compression, thereby restoring necessary information.

Further, in the present embodiment, an SID and a key sequence number, which need to be previously held and is used in order to determine whether or not key data is correct when encrypting encrypted data, are stored in the sub-storage apparatus 18. As described above, ordinarily, in a terminal apparatus, a plurality of SIDs need to be simultaneously handled, and there are a plurality of types of encrypted data to be decrypted, so that the process of confirming the SID and the key sequence number needs to be frequently performed. However, the contents of data themselves do not need to be frequently rewritten. Therefore, in the present embodiment, the sub-storage apparatus 18 directly receives data stored in the storage apparatus 16 without using the CPU bus 14, and transmits/receives data to/from the upstream data processing block 12 or the downstream data processing block 11. Data relating to a PHSF which defines a field during PHS and a PHSI which defines the maximum number of bits for PHS, as well as the SID and the key sequence number, are stored in the sub-storage apparatus 18. Nevertheless, by utilizing a direct transfer path when obtaining these data, the traffic intensity of the CPU bus 14 can be further reduced than in the third embodiment.

Also, when an upstream data process is performed, an SID and a key sequence number which are referenced when data is encrypted, an IUC (Interval Usage Code) which serves as an index for determining the types of various processes, or various MAC addresses can be stored in the sub-storage apparatus 18, as is similar to when a downstream data process is performed. Therefore, the frequency of transmission/reception between the CPU 15 and the storage apparatus 16, and the upstream data processing block 12 can be further reduced, thereby making it possible to further increase the transfer rate.

Fifth Embodiment

Figure 9:
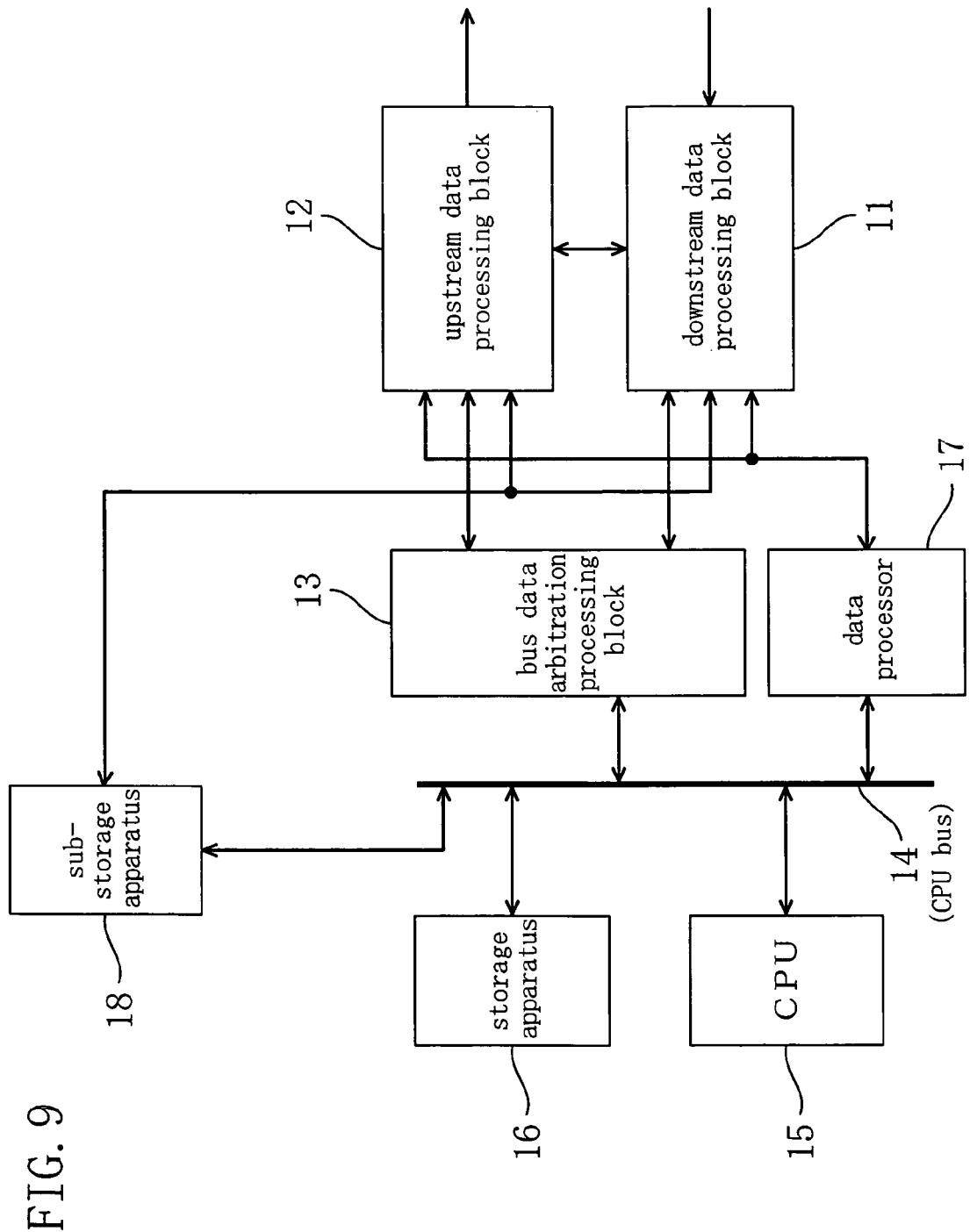
FIG. 9 is a block circuit diagram illustrating a structure of an MAC section which is a digital bidirectional communication apparatus according to a fifth embodiment.

FIG. 9 is a block circuit diagram illustrating a structure of an MAC section which is a digital bidirectional communication apparatus according to a fifth embodiment. Also in the present embodiment, the structure of the communication system is the same as that of the first embodiment, except for the MAC section, and the same parts will not be illustrated or explained. As illustrated in FIG. 9, the MAC section of the present embodiment comprises a data processor 17 and a sub-storage apparatus 18 in addition to the elements of the MAC section 3 of FIG. 1.

The digital bidirectional communication apparatus (MAC section) of the present embodiment comprises the data processor 17 as is similar to the second embodiment, and the sub-storage apparatus 18 as is similar to the third embodiment. Thereby, the following effect can be achieved.

Specifically, the storage apparatus 16, the downstream data processing block 11, and the upstream data processing block 12 can directly transmit/receive data without using the bus data arbitration processing block 13 or the CPU 15, thereby making it possible to reduce the frequency of data transmission/reception with respect to the upstream data processing block 12 and the downstream data processing block 11.

Also, with the sub-storage apparatus 18 (second storage apparatus) of the present embodiment, when a process which does not require a control of the CPU 15 is performed, data transmission/reception can be performed between the downstream data process block 11 or the upstream data processing block 12 and the sub-storage apparatus 18 while bypassing the CPU bus 14.

Therefore, according to the present embodiment, the traffic intensity of the CPU bus 14 can be further reduced, thereby further increasing the data transfer rate.

Sixth Embodiment

Figure 10:
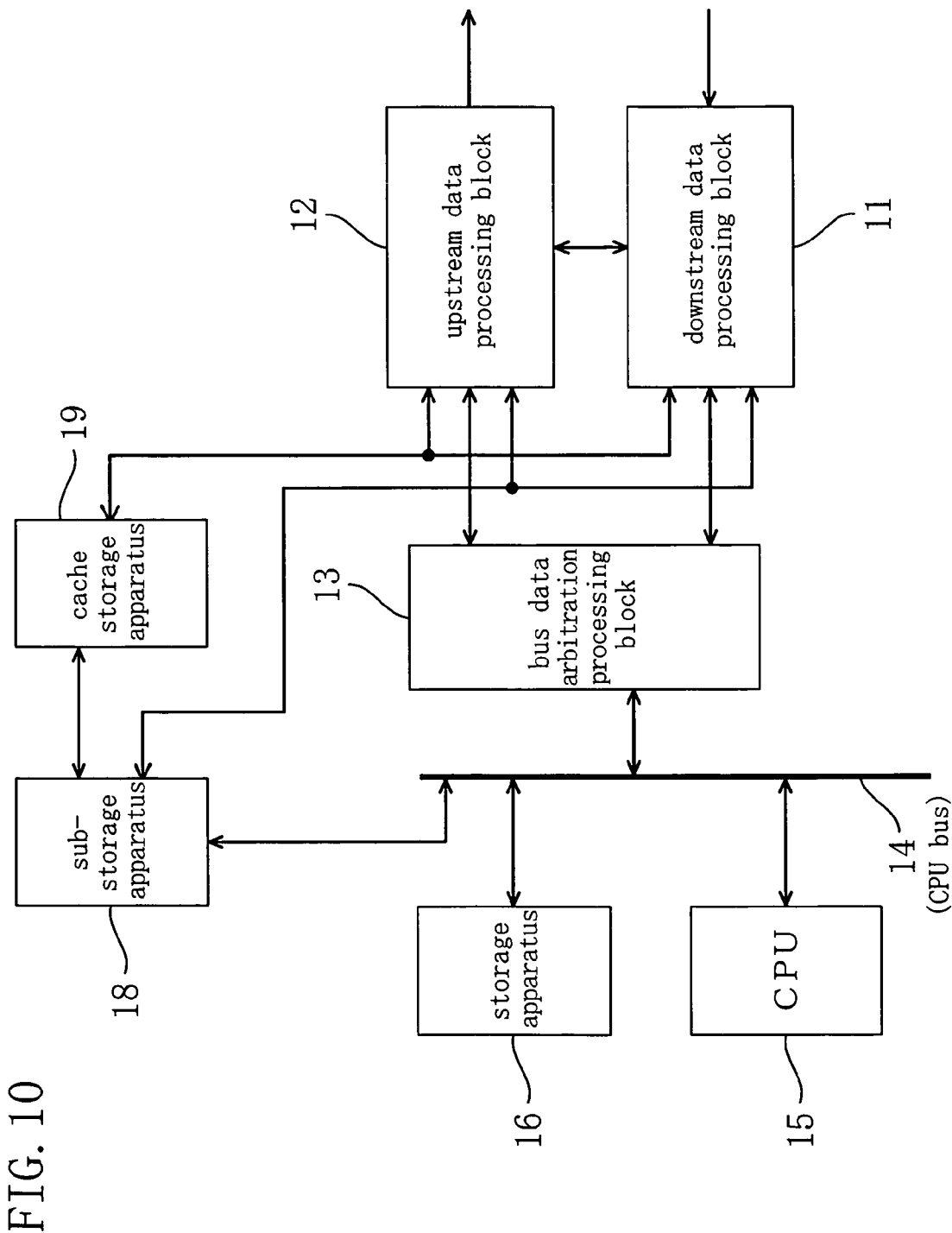
FIG. 10 is a block circuit diagram illustrating a structure of an MAC section which is a digital bidirectional communication apparatus according to a sixth embodiment.

FIG. 10 is a block circuit diagram illustrating a structure of an MAC section which is a digital bidirectional communication apparatus according to a sixth embodiment. Also in the present embodiment, the structure of the communication system is the same as that of the first embodiment, except for the MAC section, and the same parts will not be illustrated or explained. As illustrated in FIG. 10, the MAC section of the present embodiment comprises a sub-storage apparatus 18 and a cache storage apparatus 19 in addition to the elements of the MAC section 3 of FIG. 1.

The digital bidirectional communication apparatus (MAC section) of the present embodiment comprises the cache storage apparatus 19 in addition to the storage apparatus 16 (first storage apparatus) and the sub-storage apparatus 18 (second storage apparatus). Thereby, the following effect can be achieved.

In the present embodiment, the cache storage apparatus 19 (third storage apparatus) takes charge of a portion of the function of the sub-storage apparatus 18 (second storage apparatus) of the third embodiment, the fourth embodiment, or the fifth embodiment.

Specifically, when a downstream data process is performed, an SID and a key sequence number, which need to be previously held and is used when encrypting encrypted data, is stored into the cache storage apparatus 19. Data relating to a PHSF which defines a field during PHS and a PHSI which defines the maximum number of bits for PHS, are also stored in the cache storage apparatus 19.

Also, when an upstream data process is performed, an SID and a key sequence number which are referenced when data is encrypted, an IUC (Interval Usage Code) which serves as an index for determining the types of various processes, or various MAC addresses are stored in the cache storage apparatus 19, as is similar to when a downstream data process is performed. Therefore, the frequency of transmission/reception between the CPU 15 and the sub-storage apparatus 18, and the upstream data processing block 12 can be reduced. Thereby, the traffic intensity of the CPU bus 14 can be further reduced, thereby further increasing the data transfer rate Note that, in the present embodiment, the cache storage apparatus 19 invariably performs transmission/reception of various data with respect to the sub-storage apparatus 18 without data transmission/reception with respect to the downstream data processing block 11 or the upstream data processing block 12 via the CPU bus 14 or the bus data arbitration processing block 13. In other words, the cache storage apparatus 19 plays a role as a command cache which temporarily stores data relating to control of various processes and operational commands.

On the other hand, the sub-storage apparatus 18 transmits/receives data to/from the downstream data processing block 11 or the upstream data processing block 12 via the CPU bus 14 and the bus data arbitration process block 13, and in addition, can directly transmits/receives data to/from the downstream data processing block 11 or the upstream data processing block 12 as is similar to the first to fifth embodiments.

Specifically, in the present embodiment, when the traffic intensity of the CPU bus 14 considerably increases, necessary data is previously and temporarily stored in the sub-storage apparatus 18 by a control of the bus data arbitration processing block 13, and data is transmitted/received between the sub-storage apparatus 18 and the downstream data processing block 11 or the upstream data processing block 12, thereby making it possible to reduce the traffic intensity of the CPU bus 14 and thereby to increase the transfer rate. In other words, the sub-storage apparatus 18 plays a role as a data cache.

Seventh Embodiment

Figure 11:
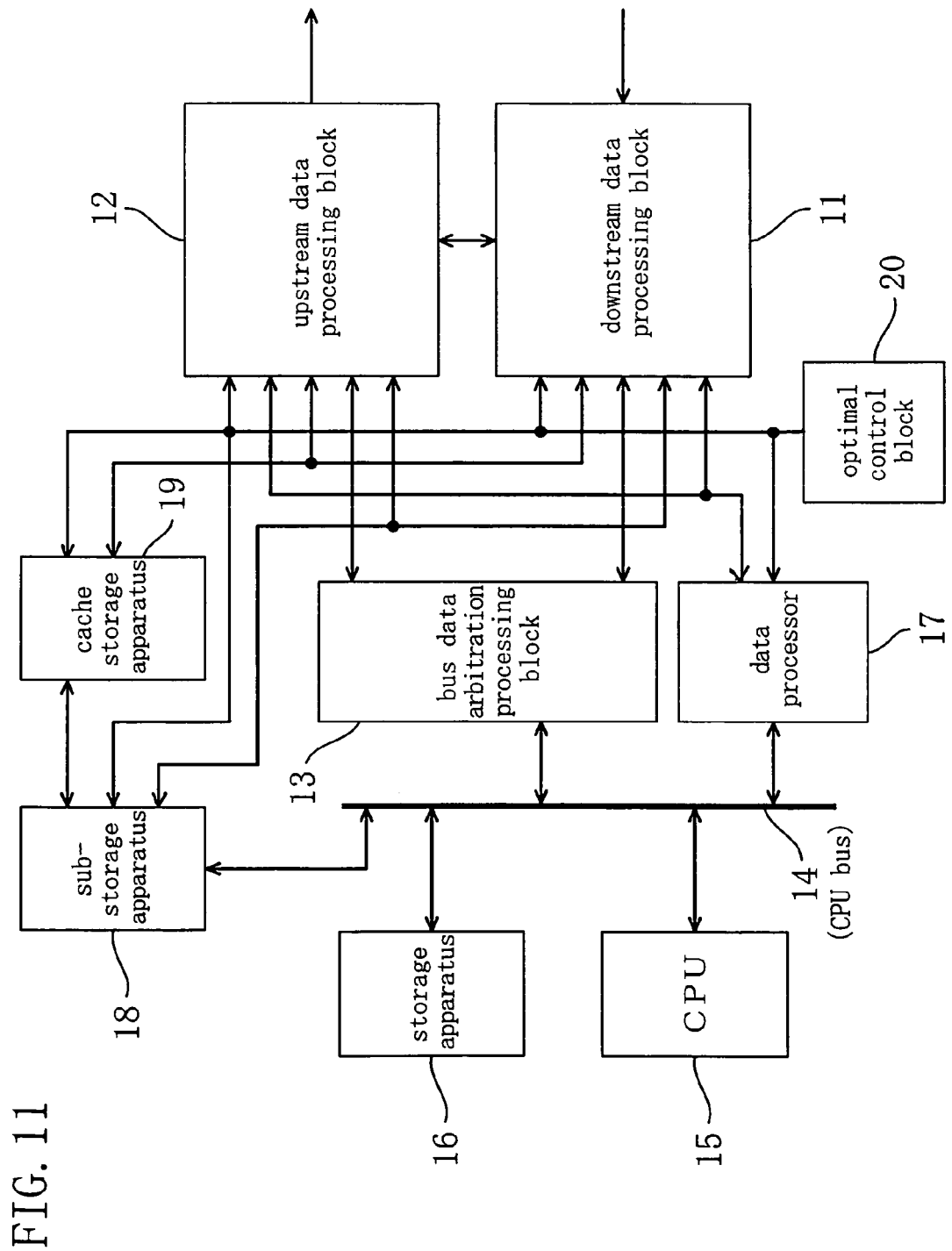
FIG. 11 is a block circuit diagram illustrating a structure of an MAC section which is a digital bidirectional communication apparatus according to a seventh embodiment.

FIG. 11 is a block circuit diagram illustrating a structure of an MAC section which is a digital bidirectional communication apparatus according to a seventh embodiment. Also in the present embodiment, the structure of the communication system is the same as that of the first embodiment, except for the MAC section, and the same parts will not be illustrated or explained. As illustrated in FIG. 11, the MAC section of the present embodiment comprises a sub-storage apparatus 18, a cache storage apparatus 19, a data processor 17, and an optimal control block 20 in addition to the elements of the MAC section 3 of FIG. 1.

The digital bidirectional communication apparatus (MAC section) of the present embodiment comprises the sub-storage apparatus 18 (second storage apparatus), the cache storage apparatus 19, the data processor 17, and the optimal control block 20 in addition to the storage apparatus 16 (first storage apparatus). Thereby, the following effect can be achieved.

According to the digital bidirectional communication apparatus of the present embodiment, the same process as that of the first embodiment of FIG. 1 is basically performed, and both the advantage of having the data processor 17 in the second embodiment and the advantage of having the sub-storage apparatus 18 and the cache storage apparatus 19 in the sixth embodiment can be achieved. Specifically, the data processor 17 takes charge of a portion of the process of the CPU 15, the sub-storage apparatus 18 performs a data cache process, and the cache storage apparatus 19 performs a command cache process, thereby making it possible to significantly reduce the frequency of data transmission/reception from the CPU 15 and the storage apparatus 16 via the CPU bus 14 and the bus data arbitration processing block 13 to the upstream data processing block 12 and the downstream data processing block 11. In addition, the optimal control block 20 is provided in order to optimally control, as a whole, storage of various data into the sub-storage apparatus 18 and the cache storage apparatus 19, and processing timing of the upstream data processing block 12, the downstream data processing block 11, and the data processor 17, thereby reducing transfer loss due to an individual handshake-type control between each block, or reducing the circuit scale while increasing the transfer rate by an appropriate control since a control circuit is not required for each block.

Note that, when the tuner 5 and the MAC section are incorporated together into one chip in the terminal apparatus 1, a system LSI which requires no external analog parts on the board can be obtained. With this structure, a PC which has an ordinary modem can be achieved, and in addition, by incorporating the structure into any communication apparatus, such as, a television, a telephone, or the like, a bidirectional communication function can be considerably easily provided.

INDUSTRIAL APPLICABILITY

The bidirectional communication control apparatus, the terminal apparatus, and the bidirectional communication control method of the present invention can be used in a mobile telephone, a personal computer having an Internet function, and the like.

What is claimed is:

1. A bidirectional communication control apparatus which is provided in a terminal apparatus which performs bidirectional data transmission/reception with respect to a center apparatus, the bidirectional communication control apparatus comprising:
a first storage apparatus;
a CPU bus connecting between the CPU and the first storage apparatus;
a downstream data processing block of receiving downstream data transmitted from the center apparatus to the terminal apparatus, and performing data processing;
an upstream data processing block of performing data processing to generate upstream data to be transmitted from the terminal apparatus to the center apparatus;
a bus data arbitration processing block of regulating a flow of data on the CPU bus, the bus data arbitration processing block being connected to the CPU bus, the downstream data processing block, and the upstream data processing block; and
a data processor having a register of temporarily holding data, the data processor being connected to the CPU bus, the upstream data processing block, and the downstream data processing block while bypassing the bus data arbitration processing block,
wherein the downstream data processing block and the upstream data processing block perform direct data transmission/reception with respect to each other.

2. The bidirectional communication control apparatus of claim 1, further comprising:
a second storage apparatus of storing a portion of contents stored in the first storage apparatus instead of the first storage apparatus, the second storage apparatus being connected to the CPU bus, the upstream data processing block, and the downstream data processing block while bypassing the bus data arbitration processing block.

3. The bidirectional communication control apparatus of claim 1, further comprising:
a second storage apparatus of storing a portion of contents stored in the first storage apparatus instead of the first storage apparatus, the second storage apparatus being connected to the upstream data processing block, the downstream data processing block, and the first storage apparatus while bypassing the bus data arbitration processing block and the CPU bus.

4. The bidirectional communication control apparatus of claim 3, further comprising:
a third storage apparatus having a function of temporarily storing data, the third storage apparatus being connected to the upstream data processing block, the downstream data processing block, and the second storage apparatus.

5. The bidirectional communication control apparatus of claim 1, further comprising:
a data processor having a register of temporarily holding data, the data processor being connected to the CPU bus, the upstream data processing block, and the downstream data processing block while bypassing the bus data arbitration processing block;
a second storage apparatus of storing a portion of contents stored in the first storage apparatus instead of the first storage apparatus, the second storage apparatus being connected to the upstream data processing block, the downstream data processing block, and the CPU bus while bypassing the bus data arbitration processing block;
a third storage apparatus having a function of temporarily storing data, the third storage apparatus being connected to the upstream data processing block, the downstream data processing block, and the second storage apparatus; and
a control block of controlling output/input of data with respect to the second storage apparatus and the third storage apparatus, the control block being connected to the upstream data processing block, the downstream data processing block, the second storage apparatus, the third storage apparatus, and the data processor.

6. The bidirectional communication control apparatus of claim 1, further comprising:
a data processor having a register of temporarily holding data, the data processor being connected to the CPU bus, the upstream data processing block, and the downstream data processing block while bypassing the bus data arbitration processing block;
a second storage apparatus of storing a portion of contents stored in the first storage apparatus instead of the first storage apparatus, the second storage apparatus being connected to the upstream data processing block, the downstream data processing block, and the first storage apparatus while bypassing the bus date arbitration processing block and the CPU bus;
a third storage apparatus having a function of temporarily storing data, the third storage apparatus being connected to the upstream data processing block, the downstream data processing block, and the second storage apparatus; and
a control block of controlling output/input of data with respect to the second storage apparatus and the third storage apparatus, the control block being connected to the upstream data processing block, the downstream data processing block, the second storage apparatus, the third storage apparatus, and the data processor.

7. The bidirectional communication control apparatus of claim 1, wherein the downstream data processing block has a basic process circuit of performing syntax analysis, header analysis, and data format conversion with respect to the downstream data, and
the basic process circuit performs direct data transmission/reception with respect to the upstream data processing block.

8. The bidirectional communication control apparatus of claim 1, wherein the upstream data processing block has a concatenated frame header adding process circuit of concatenating a plurality of pieces of upstream data into a single piece of data, and adding a concatenated frame header to the single piece of concatenated data, and the concatenated frame header adding process circuit performs direct data transmission/reception with respect to the downstream data processing block.

9. The bidirectional communication control apparatus of claim 1, wherein the upstream data processing block has a divided frame header adding process circuit of dividing a single piece of upstream data into a plurality of portions, and adding a divided frame header to each of the plurality of portions, and the divided frame header adding process circuit performs direct data transmission/reception with respect to the downstream data processing block.

10. A terminal apparatus of performing bidirectional data transmission/reception with respect to a center apparatus, comprising:

the bidirectional communication control apparatus of claim 1;

a tuner of receiving an RF signal transmitted from the center apparatus and converting the RF signal into an IF signal;

a downstream PHY block of receiving the IF signal and extracting the downstream data to be supplied to the downstream data processing block of the bidirectional communication control apparatus; and an upstream PHY block of demodulating the upstream data output from the upstream data processing block of the bidirectional communication control apparatus and transmitting the demodulated upstream data as an RF signal to the center apparatus.

11. The terminal apparatus of claim 10, further comprising:

a back-end section having a function of performing at least an image process, the back-end section being connected to the CPU bus.

* * * * *

UNITED STATES PATENT AND TRADEMARK OFFICE
CERTIFICATE OF CORRECTION

PATENT NO. : 7,580,358 B2  Page 1 of 1
APPLICATION NO. : 11/326526
DATED : August 25, 2009
INVENTOR(S) : Fukuoka et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 775 days.

Signed and Sealed this

Fourteenth Day of September, 2010

David J. Kappos
*Director of the United States Patent and Trademark Office*